(12) United States Patent
Dove et al.

(10) Patent No.: US 11,040,901 B2
(45) Date of Patent: *Jun. 22, 2021

(54) REMOVING NITRATE FROM WATER

(71) Applicant: Georgia Aquarium Inc., Atlanta, GA (US)

(72) Inventors: Alistair Dove, Marietta, GA (US); Eric Hall, Atlanta, GA (US)

(73) Assignee: Georgia Aquarium Inc., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/779,924

(22) Filed: Feb. 3, 2020

(65) Prior Publication Data
US 2021/0002159 A1    Jan. 7, 2021

Related U.S. Application Data

(63) Continuation of application No. 15/952,940, filed on Apr. 13, 2018, now Pat. No. 10,550,024, which is a (Continued)

(51) Int. Cl.
*C02F 3/30* (2006.01)
*C02F 3/34* (2006.01)
(Continued)

(52) U.S. Cl.
CPC .............. *C02F 3/305* (2013.01); *C02F 1/685* (2013.01); *C02F 3/2806* (2013.01); *C02F 3/34* (2013.01);
(Continued)

(58) Field of Classification Search
CPC .. C02F 3/305; C02F 9/00; C02F 3/345; C02F 3/34; C02F 3/2806; C02F 1/685;
(Continued)

(56) References Cited

U.S. PATENT DOCUMENTS

| 4,995,980 A | 2/1991 | Jaubert |
|---|---|---|
| 5,006,230 A | 4/1991 | Votava, III et al. |

(Continued)

FOREIGN PATENT DOCUMENTS

| CN | 103723893 | 4/2014 |
|---|---|---|
| JP | 2002-273475 | 9/2002 |

(Continued)

OTHER PUBLICATIONS

Aiken, "Sustainable Life Support System Design," Green Tales AZA, May 2015, 2 pages.

(Continued)

*Primary Examiner* — Fred Prince
(74) *Attorney, Agent, or Firm* — Fish & Richardson P.C.

(57) ABSTRACT

A sulphur denitrification system includes a liquid input fluidly coupled to a source of saltwater that includes nitrate; a liquid output fluidly coupled to the source of saltwater; a plurality of vertically-oriented tanks, at least one of the tanks including a liquid inlet that is fluidly coupled to the liquid input to receive a flow of the saltwater, a volume configured to enclose a plurality of sulphur particles that support denitrification bacteria that biologically transform the nitrate into at least one of nitrous oxide or nitrogen gas, and a liquid outlet fluidly coupled to the liquid output and the liquid inlets of the tanks; and a circulation system configured to circulate a portion of the saltwater though the liquid input to the liquid inlets of the plurality of tanks, through the plurality of tanks, and from the liquid outlets of the tanks to the liquid output and the liquid inlets of the tanks.

20 Claims, 7 Drawing Sheets

Related U.S. Application Data continuation of application No. 15/284,720, filed on Oct. 4, 2016, now Pat. No. 9,994,466.

(51) Int. Cl.

| | | |
|---|---|---|
| *C02F 1/68* | (2006.01) | |
| *C02F 3/28* | (2006.01) | |
| *C02F 9/00* | (2006.01) | |
| *C02F 3/00* | (2006.01) | |
| *A01K 63/04* | (2006.01) | |
| *C02F 1/02* | (2006.01) | |
| *C02F 1/66* | (2006.01) | |
| *C02F 1/78* | (2006.01) | |
| *C02F 101/10* | (2006.01) | |
| *C02F 103/20* | (2006.01) | |
| *C02F 101/16* | (2006.01) | |
| *C02F 103/22* | (2006.01) | |

(52) U.S. Cl.
CPC .............. *C02F 3/345* (2013.01); *C02F 9/00* (2013.01); *A01K 63/045* (2013.01); *C02F 1/02* (2013.01); *C02F 1/66* (2013.01); *C02F 1/78* (2013.01); *C02F 3/006* (2013.01); *C02F 2101/101* (2013.01); *C02F 2101/163* (2013.01); *C02F 2103/20* (2013.01); *C02F 2103/22* (2013.01); *C02F 2203/006* (2013.01); *C02F 2209/006* (2013.01); *C02F 2209/02* (2013.01); *C02F 2209/04* (2013.01); *C02F 2209/06* (2013.01); *C02F 2209/40* (2013.01); *C02F 2301/043* (2013.01); *C02F 2305/00* (2013.01); *Y02W 10/37* (2015.05)

(58) Field of Classification Search
CPC .............. C02F 3/006; C02F 2203/006; C02F 2103/20; C02F 1/78; C02F 2209/006; C02F 2209/40; C02F 2209/06; C02F 2101/163; C02F 2305/00; C02F 2209/04; C02F 2301/043; C02F 1/66; C02F 2209/02; C02F 1/02; C02F 2101/101; C02F 2103/22; Y02W 10/37; A01K 63/045
USPC ....... 210/603, 612, 614, 615, 616, 617, 631; 210/167.22, 175, 252, 259, 903, 905; 119/227, 260

See application file for complete search history.

(56) References Cited

U.S. PATENT DOCUMENTS

| | | | | |
|---|---|---|---|---|
| 5,482,630 | A | 1/1996 | Lee et al. | |
| 5,954,963 | A | 9/1999 | Matheson | |
| 9,522,832 | B2* | 12/2016 | Furuya | C02F 3/006 |
| 9,994,466 | B2 | 6/2018 | Dove et al. | |
| 10,550,024 | B2 | 2/2020 | Dove et al. | |
| 2003/0190742 | A1* | 10/2003 | Whiteman | G06Q 10/30 435/262 |
| 2005/0133423 | A1 | 6/2005 | Olivier | |
| 2006/0144784 | A1 | 7/2006 | Olivier | |
| 2007/0090030 | A1* | 4/2007 | Teran | C02F 3/006 210/86 |
| 2007/0262019 | A1 | 11/2007 | Sengupta et al. | |
| 2008/0314825 | A1 | 12/2008 | Patton et al. | |
| 2011/0062080 | A1 | 3/2011 | Galgon et al. | |
| 2011/0290007 | A1* | 12/2011 | Sudkamp | A01K 63/04 73/60.11 |
| 2012/0211417 | A1* | 8/2012 | Vegso | C02F 3/305 210/614 |
| 2014/0011185 | A1* | 1/2014 | Stroot | C12Q 3/00 435/3 |
| 2015/0010677 | A1 | 1/2015 | Yoon et al. | |
| 2016/0107911 | A1 | 4/2016 | Takada | |
| 2016/0251247 | A1 | 9/2016 | Chen et al. | |
| 2016/0272519 | A1* | 9/2016 | Ledwell | C02F 3/006 |
| 2018/0093911 | A1 | 4/2018 | Dove et al. | |
| 2018/0230032 | A1 | 8/2018 | Dove et al. | |

FOREIGN PATENT DOCUMENTS

| | | |
|---|---|---|
| JP | 2003-033794 | 2/2003 |
| JP | 2007-508813 | 4/2007 |
| JP | 2008-142613 | 6/2008 |
| JP | 2009-232824 | 10/2009 |

OTHER PUBLICATIONS

Alistair Dove PhD et al., "Multipoint data collection to optimize a sulfur-limestone autotrophic denitrification reactor," Presentation to Association of Life Support Operators, Baltimore, MD, 2008, 25 pages.

Alistair Dove PhD, "Green Operations at Georgia Aquarium: Challenges and solutions," Presentation to Green Meeting Industry Council, Jun. 2011, 15 pages.

aquamaxxaquariums.com [online], "TS-Series Sulfur Denitrators," Retrieved on Jul. 2, 2019, retrieved from URL <aquamaxxaquariums.com/calcium-and-media-reactors/ts-1-sulfur-dentirator/>, 3 pages.

facebook.com [online], "Aquamaxx Aquariums @aquamaxxaquariums," available on or before Oct. 11, 2016, 7 pages.

Fudsey, "AquaMaxx Sulfur Denitrator TS-1," Forum Post, R2R, available on or before May 10, 2016, 17 pages.

Grguric et al., "Biological denitrification in a closed seawater system," Chemosphere, 2000, 40:549-555, 7 pages.

Grguric et al., "Carbon and nitrogen balances in ocean tank at the New Jersey state aquarium," Bulletin de l'Institut océanographique, Monaco, 2001, 20(1):7.

Grguric et al., "Controlling nitrate concentrations in large seawater facilities," Pomorstvo, 2005, 19:253-262.

Hignette et al., "Elimination des nitrates par filtration biologique autotrophe sur soufre en aquariologie marine," Congress EUAC Munich, Institute Océanographique Prichard, 1997, 14 pages (English Translation).

korallin.de [online], "Willkommen auf der Homepage von," Retrieved on Nov. 23, 2002, retrieved from URL <http://korallin.de/>, 1 page.

korallin.us [online], "Sulphur based biodenitrator S1501, S3001, S4001, for effective nitrate reduction," Retrieved on Jul. 2, 2019, retrieved from URL <https://www.korallin.us/s1501eng.html>, 4 pages.

marinedeopt.com [online], "Korallin BioDenitrator w/o Pump," 1998-2020, Retrieved on Aug. 22, 2009, retrieved from URL <https://www.marinedepot.com/Korallin_BioDenitrator_w_o_Pump_Bio_Denitrators_Nitrate_Reactors-Korallin-KL9111-FIFRISDN-vi.html>, 2 pages.

Nagadomi et al., "Treatment of Aquarium Water by Denitrifying Photosynthetic Bacteria Using Immobilized Polyvinyl Alcohol Beads," Journal of Bioscience and Bioengineering, 1999, 87(2):189-93.

PCT International Preliminary Report on Patentability in International Appln. No. PCT/US2017/054958, dated Apr. 9, 2019, 6 pages.

PCT International Search Report and Written Opinion in International Appln. No. PCT/US2017/054958, dated Jan. 16, 2018, 4 pages.

Van Rijn et al., "Denitrification in recirculating systems: Theory and applications," Aquacultural Engineering, May 2006, 34(3):364-376.

Written Opinion in International Appln. No. PCT/US2017/054958, dated Jan. 15, 2018, 5 pages.

Zhang, "Development of sulfur-limestone autotrophic denitrification processes for treatment of nitrate-contaminated groundwater in small communities," Midwest Technology Assistance Center, Aug. 31, 2004, 46 pages.

Zhao et al., "Nitrate removal from saline water using autotrophic denitrification by the bacterium *Thiobacillus* ,denitrificans MP-1," Environmental Technology, Oct. 2004, 25(10):1201-1210.

(56) References Cited

OTHER PUBLICATIONS

Zhu et al., "A review of nitrate reduction using inorganic materials," Environmental Technology Reviews, Nov. 2012, 1(1):46-58.
Japanese Office Action in Japanese Application No. 2019-519231, dated Jan. 26, 2021, 8 pages (with English translation).

* cited by examiner

REMOVING NITRATE FROM WATER

CROSS-REFERENCE TO RELATED APPLICATION

This application is a continuation of, and claims priority under 35 U.S.C. § 120 to, U.S. patent application Ser. No. 15/952,940, filed on Apr. 13, 2018, and entitled "Removing Nitrate From Water," which is a continuation of, and claims priority under 35 U.S.C. § 120 to, U.S. patent application Ser. No. 15/284,720, filed on Oct. 4, 2016, and entitled "Removing Nitrate From Water," now U.S. Pat. No. 9,994,466, the entire contents of which are hereby incorporated by reference.

TECHNICAL FIELD

This document relates to systems and methods for removing nitrate from water and, more particularly, systems and methods for a denitrification system for aquaria or recirculating aquaculture systems, or both.

BACKGROUND

Water holding tanks, such as aquaria and other vessels that form animal habitats, often recycle and reuse the water (e.g., saltwater or freshwater) within the tank. In some cases, several treatment techniques may be used to clean and treat the recycled water. For example, unwanted particulates may be removed and a chemical composition of the water may be adjusted. In some cases, animals that live in the tank, as well as the food in which they consume, are creators of harmful substances in the water, e.g., through uneaten feed decomposition and animal waste. Nitrate, for example, may be a byproduct of such uneaten animal feed and animal waste that, when occurring in undesirable concentrations within the water, can affect animal health.

SUMMARY

In a general implementation, a sulphur denitrification system includes a liquid input fluidly coupled to a source of saltwater that includes nitrate; a liquid output fluidly coupled to the source of saltwater; a plurality of vertically-oriented tanks, at least one of the tanks including a liquid inlet that is fluidly coupled to the liquid input to receive a flow of the saltwater, a volume configured to enclose a plurality of sulphur particles that support denitrification bacteria that biologically transform the nitrate into at least one of nitrous oxide or nitrogen gas, and a liquid outlet fluidly coupled to the liquid output and the liquid inlets of the tanks; and a circulation system configured to circulate a portion of the saltwater though the liquid input to the liquid inlets of the plurality of tanks, through the plurality of tanks, and from the liquid outlets of the tanks to the liquid output and the liquid inlets of the tanks.

In an aspect combinable with the general implementation, the plurality of tanks are fluidly coupled in parallel between the liquid input and the liquid output.

In another aspect combinable with any of the previous aspects, at least one of the plurality of tanks includes a volume configured to enclose a plurality of calcium carbonate particles.

Another aspect combinable with any of the previous aspects further includes a carbon dioxide injection device fluidly coupled to the volume configured to enclose the plurality of calcium carbonate particles, the carbon dioxide injection device configured to circulate a flow of carbon dioxide into the volume.

Another aspect combinable with any of the previous aspects further includes a flow control device fluidly coupled between the liquid outlets of the tanks and the liquid inlets of the plurality of tanks.

In another aspect combinable with any of the previous aspects, the flow control device includes a modulating valve positioned in a bypass conduit coupled between the liquid outlets of the tanks and the liquid inlets of the plurality of tanks.

In another aspect combinable with any of the previous aspects, the denitrification bacteria includes *Thiobacillus denarificans*.

In another aspect combinable with any of the previous aspects, at least one of the plurality of tanks further includes a gas release device positioned at or near a top portion of the tank, the gas release device configured to open and fluidly couple the volume of the tank to an ambient environment at or above a set pressure in the volume.

In another aspect combinable with any of the previous aspects, the liquid output includes an expansion valve and a gas release device positioned adjacent the expansion valve, the expansion valve configured to reduce a pressure of the saltwater in the circulation system to at or near ambient pressure.

In another aspect combinable with any of the previous aspects, the circulation system includes one or more pumps fluidly coupled to the liquid input, the liquid output, and the plurality of tanks with fluid conduits.

Another aspect combinable with any of the previous aspects further includes a temperature control system that includes at least one temperature sensor mounted in at least one of the liquid input, the liquid output, or the liquid outlet; and a heater mounted in at least one of the liquid input, the liquid output, or the liquid outlet, and configured to raise a temperature of the flow of the saltwater.

Another aspect combinable with any of the previous aspects further includes an ozone system that includes at least one oxidation reduction potential sensor mounted in at least one of the liquid input, the liquid output, or the liquid outlet; and one or more ozone contactors mounted in the liquid output and configured to inject ozone into the flow of the saltwater.

In another aspect combinable with any of the previous aspects, the source of saltwater includes an artificial animal habitat.

In another aspect combinable with any of the previous aspects, the artificial animal habitat includes at least one of an aquarium or a recirculating aquaculture system.

In another general implementation, a sulphur denitrification process includes circulating saltwater from a source of saltwater that includes nitrate through a liquid input to a plurality of vertically-oriented tanks; circulating at least a portion of saltwater through liquid inlets of at least one of the plurality of tanks and through a plurality of sulphur particles that support denitrification bacteria within the tank; transforming at least a portion of the nitrate, with the denitrification bacteria, to at least one of nitrous oxide or nitrogen gas; circulating the portion of saltwater from the volumes of the plurality of tanks through liquid outlets of the plurality of tanks; proportioning the portion of saltwater circulated from the liquid outlets into a first flow of saltwater and a second flow of saltwater; circulating the first flow of saltwater from the liquid outlets to the source of saltwater;

and circulating the second flow of saltwater to the liquid inlets of the plurality of tanks.

An aspect combinable with the general implementation further includes circulating the portion of saltwater through the vertically-oriented tanks in parallel.

Another aspect combinable with any of the previous aspects further includes circulating another portion of the saltwater through a liquid inlet of another of the plurality of tanks and through calcium carbonate enclosed within the other tank.

Another aspect combinable with any of the previous aspects further includes injecting carbon dioxide into the other tank that encloses the calcium carbonate; and increasing a rate of dissolution of the calcium carbonate into the other portion of saltwater based on the injected carbon dioxide.

In another aspect combinable with any of the previous aspects, injecting carbon dioxide into the other tank that encloses the calcium carbonate includes comparing a pH level of the saltwater to a threshold value pH; based on the comparison, injecting the carbon dioxide into the other tank that encloses the calcium carbonate.

Another aspect combinable with any of the previous aspects further includes controlling a flow rate of the second flow of saltwater from the liquid outlets to the liquid inlets.

In another aspect combinable with any of the previous aspects, the denitrification bacteria includes *Thiobacillus denitrificans*.

Another aspect combinable with any of the previous aspects further includes releasing nitrogen gas from the at least one tank to an ambient environment.

Another aspect combinable with any of the previous aspects further includes reducing a pressure of the first flow of saltwater circulating to the source of saltwater to at or near ambient pressure; and based on the reduction of pressure, releasing nitrogen gas from the first flow of saltwater.

Another aspect combinable with any of the previous aspects further includes reducing a pressure of the second flow of saltwater circulating to the liquid inlets of the plurality of tanks to at or near ambient pressure; and based on the reduction of pressure, releasing nitrogen gas from the second flow of saltwater.

In another aspect combinable with any of the previous aspects, the source of saltwater includes an artificial animal habitat.

In another general implementation, a system includes a water holding tank that includes a volume of water that includes nitrate; a denitrification system fluidly coupled to the water holding tank to receive a flow of water from the water holding tank, circulate the flow of water through a plurality of denitrification chambers, and transform at least a portion of the nitrate into nitrogen gas in the chambers; and a control system. The control system includes a sensor positioned in the flow of water; one or more hardware processors; and a data store coupled to the one or more hardware processors and storing instructions which, when executed by the one or more hardware processors, causes the one or more hardware processors to perform operations including receiving, from the sensor, a measurement associated with a nitrate concentration in the flow of water; comparing the measurement with a nitrate concentration setpoint; and adjusting a component of the denitrification system based on the measurement exceeding the nitrate concentration setpoint.

In an aspect combinable with the general implementation, adjusting a component of the denitrification system includes modulating at least one valve of the denitrification system to reduce a rate of flow of the water recirculated directly from outlets of the plurality of denitrification tanks to inlets of the denitrification tanks.

In another aspect combinable with any of the previous aspects, adjusting a component of the denitrification system includes adjusting a speed of a pump of the denitrification system to reduce a rate of flow of the water from the water holding tank to the denitrification system.

In another aspect combinable with any of the previous aspects, a component of the denitrification system includes injecting a carbon dioxide fluid into a pH balancing tank of the denitrification system to increase a rate of dissolution of calcium carbonate or aragonite into the flow of water.

In another aspect combinable with any of the previous aspects, adjusting a component of the denitrification system includes adjusting an expansion valve of the denitrification system to decrease a pressure of the flow of water circulated from the denitrification system back to the water holding tank.

In another general implementation, a method includes circulating saltwater from a saltwater holding tank to a plurality of tanks; circulating a first portion of the saltwater through sulphur and denitrification bacteria stored in at least one of the plurality of tanks to reduce a nitrate concentration in the saltwater at a rate of nitrate concentration reduction; circulating a second portion of the saltwater through calcium carbonate or aragonite stored in at least another of the plurality of tanks; mixing the first and second portions of the saltwater downstream of the plurality of tanks; injecting a carbon dioxide fluid into the another of the plurality of tanks; and increasing the rate of nitrate concentration reduction in the saltwater based on injecting the carbon dioxide fluid.

An aspect combinable with the general implementation further includes increasing, based on the injected carbon dioxide fluid, a concentration of calcium carbonate or aragonite dissolved into solution in the mixed first and second portions of the saltwater.

In another aspect combinable with any of the previous aspects, increasing the rate of nitrate concentration reduction in the saltwater based, at least in part, on injecting the carbon dioxide fluid includes increasing the rate of nitrate concentration reduction in the saltwater based on the increased concentration of calcium carbonate or aragonite dissolved into solution in the mixed first and second portions of the saltwater.

One, some, or all of the implementations of a denitrification system according to the present disclosure may include one or more of the following features. For example, the denitrification system of the present disclosure may more efficiently, e.g., pumping less water and using smaller sized equipment, implement a denitrification process to remove nitrate from an animal habitat relative to conventional denitrification systems. As another example, the denitrification system of the present disclosure may remove more nitrate on an absolute basis than conventional denitrification systems. As yet another example, the denitrification system of the present disclosure may be implemented seamlessly within a larger water treatment system for an animal habitat as compared to conventional denitrification systems. As another example, the denitrification system of this present disclosure may operate more reliably and offer less service or process interruption, thereby providing very stable operating conditions for a the living and breathing biological process of denitrification. Embodiments of the denitrification system may optimize these parameters for greater process longevity. As another example, the denitrification system of the present disclosure may offer greater integration capabilities as example embodiments may allow the denitrification system to be constructed as a skid unit to provide a "plug-and-play" system for a more widespread range of water sources and parameter types than anything that is currently offered. As another example, the denitrification system of the present disclosure may offer a lower maintenance or operator friendly version as compared to conventional denitrification. As another example, the denitrification system of the present disclosure may operate with a saltwater or freshwater water source.

The details of one or more embodiments are set forth in the accompanying drawings and the description below. Other features, objects, and advantages will be apparent from the description and drawings, and from the claims.

DETAILED DESCRIPTION

This document discusses implementations of a denitrification system that operates to transform nitrate (e.g., soluble) in a flow of water to nitrite and then to, e.g., nitrous oxide ($N_xO_x$) and then nitrogen gas ($N_2$), to lower a nitrate concentration in the flow of water. In some aspects, the flow of water originates in an animal habitat or other recirculating aquatic animal holding system that supports marine fish and other animals with a manufactured volume of saltwater (or with a volume of freshwater). The denitrification system described in the present disclosure, for example, utilizes a recirculation loop to increase hydraulic retention time of the flow of water within the denitrification system, thereby increasing an efficiency of the denitrification process. In some aspects, the denitrification process is an autotrophic sulphur denitrification process that also includes pH balancing of the water to increase the efficiency of the denitrification process.

Figure 1:
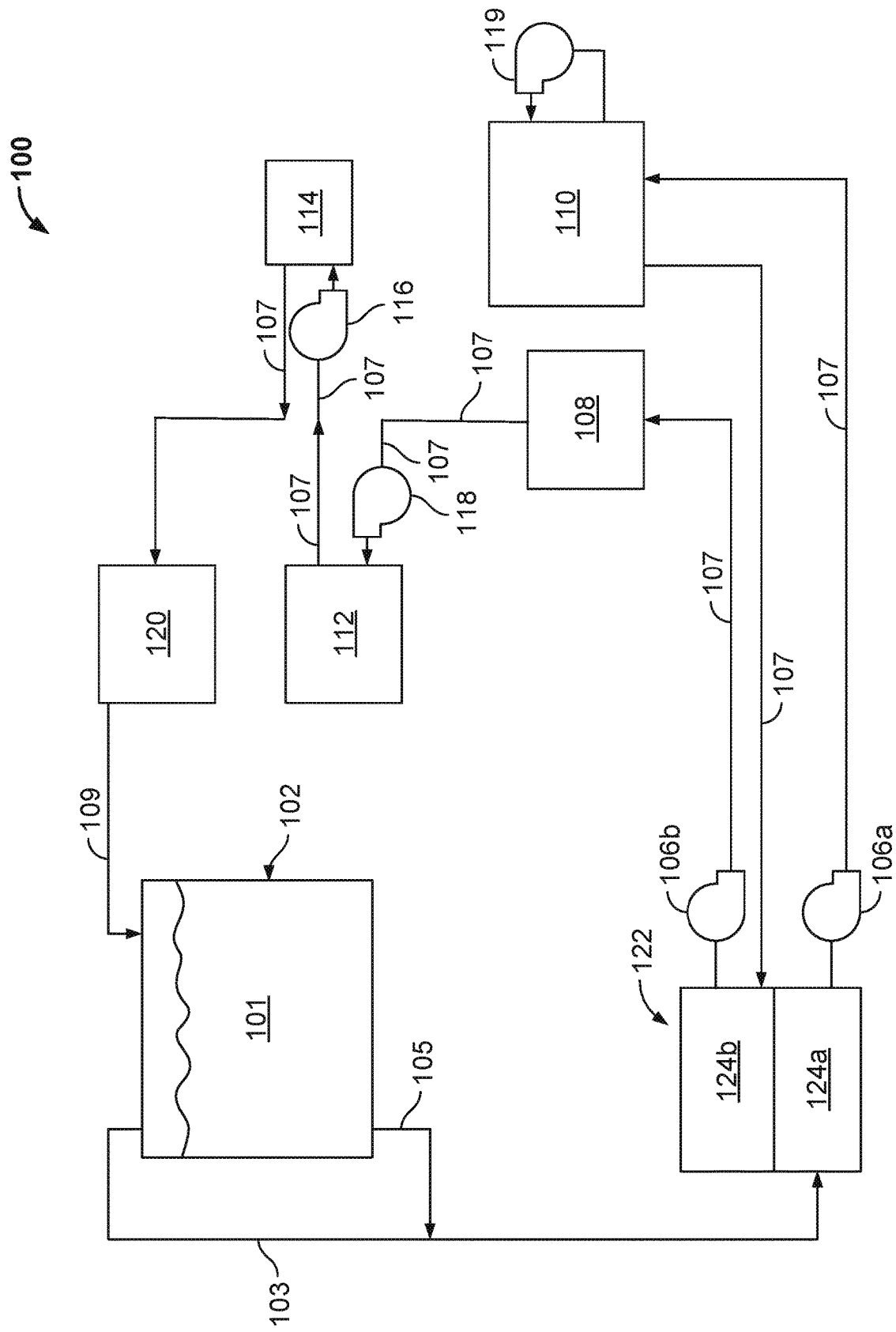
FIG. 1 illustrates a schematic diagram of an example implementation for a saltwater treatment system according to the present disclosure.

FIG. 1 illustrates a schematic diagram of an example implementation for a saltwater treatment system 100. Generally, the saltwater treatment system 100 may include or be fluidly coupled to a source of saltwater, such as saltwater source 102, to receive a flow of saltwater 101, filter the flow of saltwater 101, and treat the flow of saltwater 101 (e.g., mechanically, chemically, biologically, or a combination thereof), before the flow of saltwater 101 is returned to the source. In some aspects, the source of saltwater may be an enclosed tank, such as an aquarium or recirculating aquaculture system. The enclosed tank, in some aspects, may be fluidly coupled to a source of natural seawater (e.g., ocean, sea, or other source). In alternative aspects, the enclosed tank may not be fluidly coupled to a source of natural seawater and, for instance, may be located in a geographic area that is not immediately adjacent a source of natural seawater (e.g., in a landlocked area). In some aspects, the enclosed tank, as an aquarium or recirculating aquaculture system, may support living animals, such as fish, mammals, crustaceans, and other animals.

In some aspects, aquaria systems and recirculating aquaculture systems may have different configurations based on the different purposes of such systems. For example, an aquarium may be comprised of a single animal habitat tank, or multiple independent animal habitat tanks that are fluidly coupled to share a water source but independent in that animals from one tank may not typically or ever be transferred to another tank. In some aspects, a particular animal or animals may spend its life or a majority of its life in a single tank of an aquarium system. Concerns for an aquarium system may include maintaining low animal populations within a particular tank so that animal density within the tank does not exceed a particular threshold (e.g., so that animal viewing is not impeded, animal life expectation is maximized, and otherwise).

In contrast, a recirculating aquaculture system (RAS) may include a system or series of systems of one or more freshwater, brackish, or saltwater (artificial or natural in type) animal holding or grow out tanks. These tanks are not necessarily habitats but may be utilized for the purposes of supporting animal life and rapid growth of animal life for the purpose of eventual harvest and preparation of the animal life (e.g., fish) for human consumption. An RAS may have a high animal stocking density (or densities) compared to aquaria systems, such as several hundred kilograms of fish mass per cubic meter of water. Such RAS animal density may be over 100 times greater than in a typical aquaria setting.

These animal stocking densities often require animal feed rates relative to aquaria systems that generate high levels of dissolved nitrogen that becomes nitrate, as well as large amounts of carbon dioxide due to animal respiration. Filtration components in RAS, like aquaria systems, may include mechanical, biological, and chemical filtration. In some aspects of RAS, a gas exchange system may be included (e.g., within system 100) due to high levels of dissolved carbon dioxide within the saltwater source 102. Carbon dioxide may be mechanically stripped from the saltwater 101 utilizing rapid agitation in RAS and harvested in a negative pressure ducting system.

System 100 includes, as shown in the example implementation of FIG. 1, the saltwater source 102, which is fluidly coupled, through conduits 107 (e.g., piping), to a number of treatment subsystems, such as a sand filter system 108, a foam fractionation system 110, a denitrification system 112, an ozone system 114, a deaeration system 120, and a return sump 122. The system 100 further includes, in this example, pumps 106a, 106b, 116, and 118, that are positioned to circulate a flow of saltwater from the saltwater source 102 to one or more of the components of system 100.

The saltwater source 102, in this example, is an enclosed tank (e.g., with a top open to an ambient environment) that includes an aquarium or recirculating aquaculture system that supports animal life, such as fish and other animals. In this example embodiment, the saltwater source 102 may hold or contain about 4 million gallons of saltwater 101, while the system 100, including conduits, piping, and the aforementioned subsystems, may hold or contain more than 6 million gallons of saltwater 101. The saltwater 101 enclosed within the system 100 may be initially manufactured from freshwater, salt, and other additives (e.g., chemicals) or may be circulated into the system 100 from a natural source of seawater (if available). For simplicity, certain components of the system 100, such as chemical additive systems, make-up saltwater systems, nutrient additive systems (for animal and plant feeding) are omitted from the schematic illustration of FIG. 1.

As shown, fluid conduits 103 and 105 couple the saltwater source 102 to the return sump 122. The fluid conduit 103 couples a top surface of saltwater 101 in the saltwater source 102 to the return sump 122, while the fluid conduit 105 couples a bottom portion (e.g., between 30 and 40 feet deeper than the top surface of the saltwater 101) of the saltwater 101 to the return sump 122. In some implementations, the saltwater 101 may flow, e.g., by gravity, from the saltwater source 102, through surface skimmers (in conduit 103) and bottom drains (in conduit 105) to the return sump 122. The return sump 122, in this example, is divided into two sections, chamber 124a and chamber 124b, which are divided by a wall. Chamber 124a is fluidly coupled, by the conduits 103 and 105, to the saltwater source 102. Chamber 124a is also fluidly coupled, through the pump 106a, to the foam fractionation system 110. Chamber 124b is fluidly coupled to receive the flow of saltwater 101 from the foam fractionation system 110, as well as other components of the system 100.

The foam fractionation system 110 (i.e., a protein skimming system), generally, includes multiple tanks that comprise a recirculating process loop from chamber 124a back to chamber 124b of the return sump 122. The foam fractionation system 110 targets the removal of dissolved organic or liquid waste by incorporating air/water to make foam, and, as shown, may include a pump 119 that recirculates at least a portion of the saltwater 101 through the tanks of the system 110. The polarity of the water molecule and the surface tension of the foam create an affinity for these waste products that allow the dirty foam to be "fractioned" off the top of the tanks in the system 110, thus removing the waste products from the process. In some aspects, a small amount of ozone gas can be dosed to the air/water stream in the foam fractionation system 110 to augment this process and also create micro flocculation which assists in other treatment of the saltwater 101 (e.g., in the sand filter system 108).

The sand filter system 108 is fluidly coupled to the chamber 124b of the return sump 122, and includes multiple tanks for rapid particulate removal from the flow of saltwater 101. The sand filter system 108, once loaded with particulate material, may also be backwashed periodically to clean them. Aside from mechanically filtering particulates from the water, the sand filter system 108 also creates a location for aerobic heterotrophic bacteria, discussed in more detail later, to thrive. For example, due to high water flow and a large surface area within each tank of the sand filter system 108, some biological filtration, as well as mechanical filtration, takes place during operation. For instance, bio-films within a tank of the sand filter system 108 may synthesize nutrients such as nitrogen, phosphorus and organic carbon. In some examples, the sand filter system 108 can remove particles in the saltwater flow of approximately 20 microns and larger.

As shown in this example, the denitrification system 112 and ozone system 114 are fluidly coupled to receive portions of the flow of saltwater 101 through system 100 from the sand filter system 108. For instance, pump 118 is positioned to circulate a portion of the flow of saltwater 101 through the denitrification system 112, while the pump 116 is positioned to circulate a portion of the flow of saltwater 101 through the ozone system 114.

The denitrification system 112, as shown, receives a portion of the flow of saltwater 101 that circulates through the system 100. Generally, the denitrification system 112 biologically converts nitrate in the saltwater 101 to nitrite and then, nitrous oxide, and then (potentially) nitrogen gas. For example, in aquaria and recirculating aquaculture systems, changes in the water source, such as water changes to the saltwater 101 in the saltwater source 102, may be necessary due to an accumulation of nitrogen-based products from food and animal waste that ultimately end up in the form of dissolved nitrate ($NO_3$). This nitrate may be formed as an end product of the nitrifying portion of the nitrogen cycle and can cause chronic health issues in animals within the aquaria, such as fish and invertebrates, at high concentrations. The nitrifying portion of the nitrogen cycle is aerobic and occurs readily in water and on substrates in closed aquarium or recirculating aquaculture systems due to the presence and abundance of aerobic bacteria and dissolved oxygen. Under such conditions, these environmental bacteria, called nitrifyers, readily oxidize ammonia, which is the dominant excreted animal waste product, to nitrite and then to nitrate. The denitrifying portion of the nitrogen cycle, which reduces the nitrate back to gaseous nitrogen, can be carried out by denitrifyers. Denitrifyers, in some aspects, can be facultatively anaerobic bacteria that utilize alternative oxygen sources such as the nitrate compound in low oxygen environments. This may be more difficult to achieve in closed system aquaria, e.g., due to the desirable or required anaerobic conditions being difficult to replicate and sustain in an otherwise aerobic environment.

Problems associated with high nitrate concentrations in saltwater (or freshwater) can be addressed by water changes in the proportion of 10-30% of a total volume per week in a saltwater (or freshwater) source. Water changes, for example, include circulating a portion of the saltwater out of a closed system while also circulating another portion of new saltwater (e.g., manufactured or from a natural source of saltwater) into the system. The new saltwater (or freshwater) helps dilute excessive nitrate concentrations and thus sustain a healthy water chemistry for the animals. Alternatively, a denitrification system, such as the denitrification system 112, may be used to transform all or a portion of the nitrate in the saltwater to nitrogen gas, which can then be removed from the saltwater.

In example implementations, the denitrification system 112 may be a sulphur denitrification system 112. For example, a sulfur denitrification (SDN) system may implement an autotrophic process that requires little or no external feeding or supplementation with a carbon energy source. By contrast, heterotrophic denitrification relies on externally supplied carbon, usually in the form of ethanol or methanol to be the energy source for the reaction. SDN processes cultivate sulfur-loving facultatively anaerobic bacteria that reduce nitrate ($NO_3$) to nitrous oxides ($N_xO_x$) and ultimately nitrogen gas ($N_2$). Due to their anaerobic nature, applications of SDN may occur inside a closed reactor containing elemental sulfur at water flow rates determined to preserve low oxygen tensions. Under such conditions, bacteria such as *Thiobacillus denitrificans*, and other similar sulfur-loving bacteria, thrive on elemental sulfur and reduce nitrates to nitrogen gas, as shown in Equation 1:

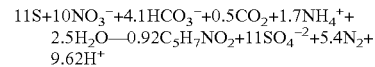

Sulfur is the medium that the bacteria reside on and also acts as the electron donor or energy source for the bacteria.

The denitrification process also consumes available carbon in the form of carbon dioxide, carbonate and bicarbonate as primary constituents of the reaction. Although readily available in natural seawater, carbonate can become depleted in a recirculated SDN process loop. In some aspects of saltwater treatment system 100, a calcium carbonate source, such as aragonite, may be placed within the system 100 (or within another system fluidly coupled to the system 100, such as the denitrification system 112) to supplement and optimize the SDN process.

The ozone system 114, as shown, receives a portion of the flow of saltwater 101 that circulates through the system 100. In some aspects, ozone gas may be generated onsite and injected into the saltwater in the system 100. The ozone may be injected, in some examples, at both the foam fractionation system 110 and at ozone contactors as part of the ozone system 114 that is located in the system 100 downstream of the sand filter system 108. Ozone contactors may act as a form of chemical filtration including color removal, organic removal and disinfection for the saltwater source 102. The ozone's oxidizing effects are measured using oxidation reduction potential (ORP) sensors that control the flow of ozone gas to the ozone contactors in the ozone system 114. Ozonated saltwater from the foam fractionation system 110 (through the sand filter system 108 and denitrification system 112) and ozone system 114 is circulated to the deaeration system 120.

Prior to returning to the saltwater source 102, the saltwater 101 in the system 100 is circulated to the deaeration system 120. The deaeration system 120 includes one or more degassing towers that balance dissolved gasses in the saltwater 101, such as oxygen and carbon dioxide, into equilibrium with the atmosphere. In some aspects, the deaeration system 120 may also be a beneficial bio-film growth location for biological filtration to occur in the saltwater. Treated saltwater 101 may be circulated from the deaeration system 120, e.g., by gravity feed in conduit 109, back to the saltwater source 102.

One or more additional systems and subsystems, not shown in FIG. 1, may also be part of the saltwater treatment system 100. For example, one or more heat exchangers (e.g., plate and frame, shell and tube, or other form of heat exchanger) may be thermally coupled within the system 100 and also to one or more heating sources (e.g., boilers) and one or more cooling sources (e.g., chillers). For example, in some aspects, first sides of the one or more heat exchangers may be fluidly coupled to the conduits 107 within the system 100, while second sides of the one or more heat exchangers may be fluidly coupled to the heating sources, the cooling sources, or both. The first and second sides of the heat exchangers may be thermally coupled to exchange heat between the saltwater 101 and the heating or cooling sources.

The saltwater treatment system 100 may also include a backwash recovery system, which can capture sand filter backwash waste water in one or more basins. In some aspects, there may be at least one "clean" basin and at least one "dirty" basin. Using the dirty basin(s) and the clean basin(s), sand filter backwash water can be batch treated with a dedicated sand filter, foam fractionation and ozone contact for the recovery system (that operate as described for these features within the system 100. Once batch filtered and recovered to the clean basin(s), the backwash water be reused and circulated to the saltwater source 102.

The saltwater treatment system 100 may also include a flow control system. The flow control system can include the pumps 106a, 106b, 116, 118, and 119 for example, to pump the streams of saltwater 101 in the system, one or more flow pipes, such as conduits 103, 105, 107, and 109 through which the streams are flowed and one or more valves to regulate the flow of the saltwater 101 through the pipes. In some implementations, a flow control system can be operated manually. For example, an operator can set a flow rate for each pump and set valve open or close positions to regulate the flow of the saltwater 101 through the pipes in the flow control system. Once the operator has set the flow rates and the valve open or close positions for all flow control systems distributed across the saltwater treatment system 100, the flow control system can flow the saltwater 101 within the system 100 under constant flow conditions, for example, constant volumetric rate, or other flow conditions. To change the flow conditions, the operator can manually operate the flow control system, for example, by changing the pump flow rate or the valve open or closed position.

In some implementations, a flow control system can be operated automatically. For example, the flow control system can be connected to a computer system to operate the flow control system. The computer system can include a computer-readable medium storing instructions (such as flow control instructions and other instructions) executable by one or more processors to perform operations (such as flow control operations). An operator can set the flow rates and the valve open or close positions for all flow control systems distributed across the saltwater treatment system 100 using the computer system. In such implementations, the operator can manually change the flow conditions by providing inputs through the computer system. Also, in such implementations, the computer system can automatically (that is, without manual intervention) control one or more of the flow control systems, for example, using feedback systems implemented in the saltwater treatment system 100 and connected to the computer system. For example, a sensor (e.g., a pressure sensor, temperature sensor, flow sensor, nitrate sensor, or other sensor) can be connected to a pipe through which the saltwater 101 flows. The sensor(s) can monitor and provide a flow condition (e.g., a pressure, temperature, flow rate, nitrate concentration, or other flow condition) of the saltwater 101 to the computer system. In response to the flow condition exceeding a threshold (e.g., a threshold pressure value, a threshold temperature value, a threshold flow value, a threshold nitrate concentration value, or other threshold value), the computer system can automatically perform operations.

In an example operation of the saltwater treatment system 100, saltwater 101 is circulated from the saltwater source 102 to chamber 124a. In some aspects, the saltwater source 102 may contain about 4 million gallons of the saltwater 101 and a portion of the saltwater is continuously or periodically circulated to the chamber 124a. The saltwater 101 can then be circulated to the foam fractionation system 110, where, e.g., dissolved organic and liquid waste can be removed and ozone can be put into the saltwater 101. In some aspects, the amount of saltwater 101 circulated to the foam fractionation system 110 at about 65,000 gallons per minute (gpm).

The saltwater 101 is circulated back to chamber 124b from the foam fractionation system 110 and then to the sand filter system 108, where particulate matter is removed from the saltwater 101. As with the foam fractionation system 110, the sand filter system 108 may handle about 65,000 gpm of the saltwater 101.

The saltwater 101 that is circulated from the sand filter system 108 is then circulated to the deaeration system 120. Portions of the saltwater 101, e.g., portions of the 65,000 gpm that flow through the foam fractionation system 110 and the sand filter system 108, are circulated to the denitrification system 112 and then to the ozone system 114. In some implementations, a small portion (e.g., 50 gpm, 100 gpm, 200 gpm, 300 gpm, 400 gpm or another volumetric flow rate) is circulated through the denitrification system 112 and then to the ozone system 114 is then circulated (with the main flow of the saltwater 101) to the deaeration system 120. Once ozone has contacted the saltwater 101, nitrate is removed from the saltwater 101, and dissolved gasses in the saltwater 101 are balanced, the flow of saltwater 101 is returned to the saltwater source 102.

Figure 2A:
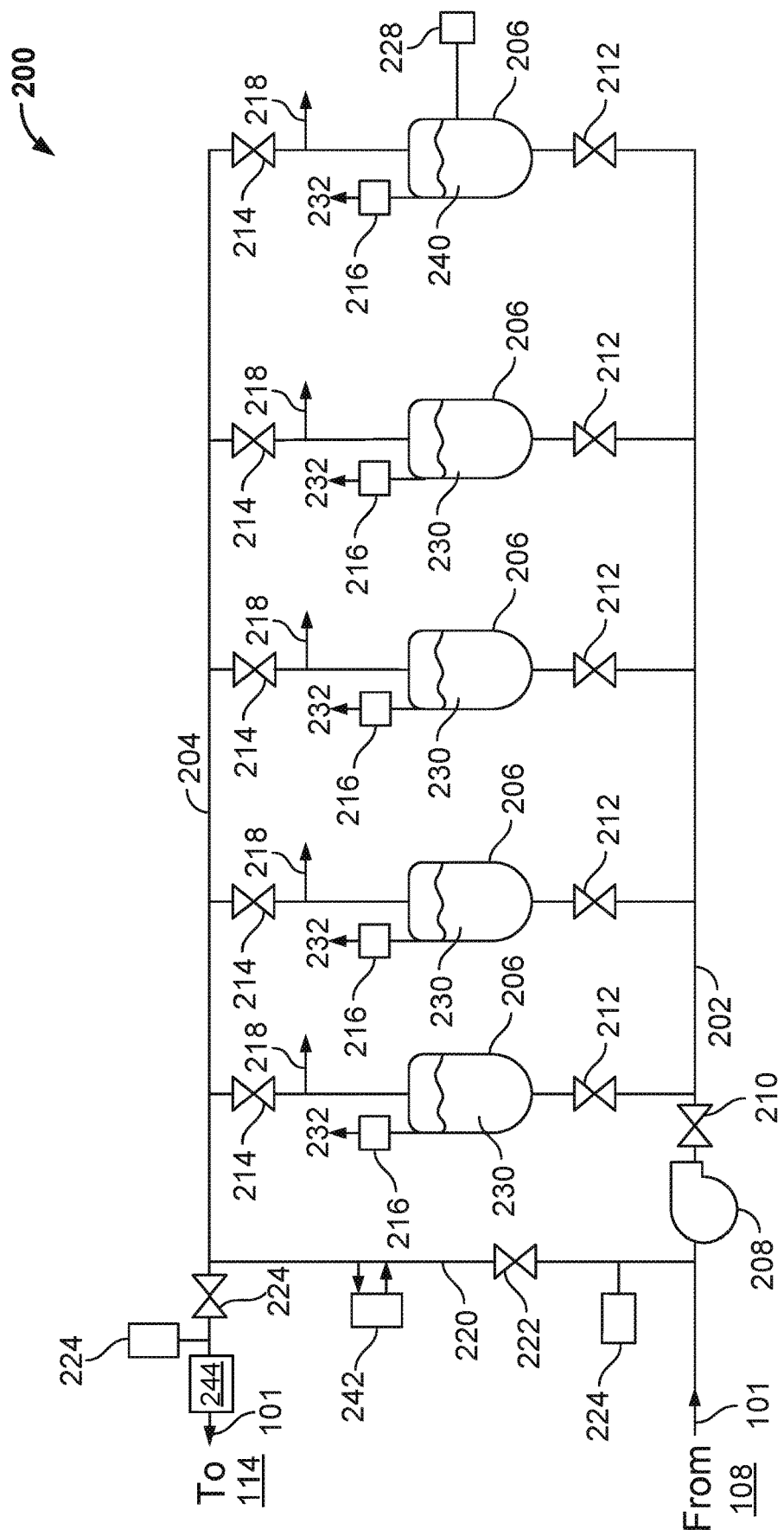
FIGS. 2A-2B illustrate schematic diagrams of example implementations of a denitrification system for a saltwater treatment system according to the present disclosure.
Figure 2B:
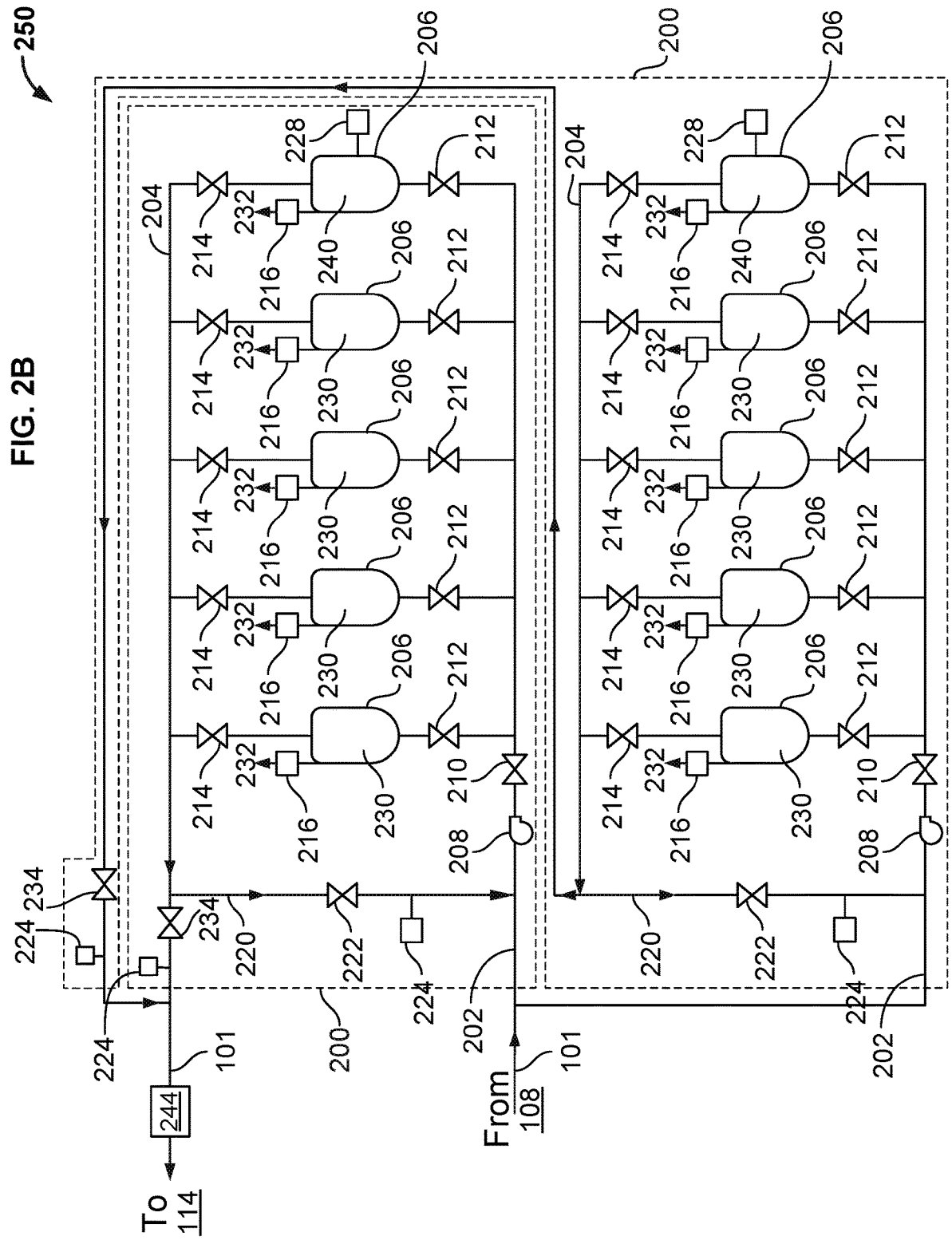

FIGS. 2A-2B illustrate schematic diagrams of example implementations of a denitrification system for a saltwater treatment system. FIG. 2A, for example, illustrates an example implementation of a sulphur denitrification system 200 that, in some aspects, may be implemented as the denitrification system 112 shown in FIG. 1. For example, as shown in FIG. 2A, the denitrification system 200 is fluidly coupled to receive a flow of the saltwater 101 from the saltwater source 102, treat the flow of saltwater 101 (e.g., implement the denitrification process) and return the treated saltwater 101 to the saltwater source 102.

As illustrated, generally, the denitrification system 200 comprises a recirculation loop that is fluidly coupled to the saltwater source 102 and, within the recirculation loop, includes multiple tanks 206. The recirculation loop comprises an inlet header 202 that is fluidly coupled to the saltwater source 102 and, through valves 212, to inlets of the tanks 206. The recirculation loop also includes an outlet header 204 that is fluidly coupled to the saltwater source 102 and, through valves 214, to outlets of the tanks 206. The outlet header 204 is fluidly coupled to the inlet header 202 as well, e.g., by bypass header 220 and valve 222.

In this example, at least some of the tanks 206 define volumes that can hold media 230 and bacteria used in the denitrification process. For example, in some aspects, at least some of the tanks 206 may hold sulphur media 230 that support bacteria (e.g., *Thiobacillus denarificans*) used to transform nitrate to, e.g., nitrous oxide and/or nitrogen gas during SDN. In some examples, the media 230 may include sulfur media that is comprised of a 99.9% elemental sulfur "prill."

Further, in this example, at least one of the tanks 206 may define a volume that can hold a calcium carbonate media 240, such as calcium carbonite (CaCO3) or aragonite (i.e., naturally occurring $CaCO_3$). For example, as shown, the tanks 206 are coupled in parallel with respect to the inlet and outlet headers 202 and 204, and several (e.g., four) of the tanks 206 hold denitrification media 230 while one tank 206 holds the calcium carbonate media 240. In alternative implementations, there may be more or fewer tanks 206 that hold the denitrification media 230 and there may be more or fewer tanks 206 that hold the calcium carbonate media 240.

In this example, the tank 206 that holds the calcium carbonate media 240 also includes a carbon dioxide ($CO_2$) injection system 228. For example, in some aspects, SDN may be implemented more at a water pH of about 5.5 pH. The calcium carbonate media 240 (e.g., $CaCO_3$, aragonite, or other media) may help maintain a specified or predetermined pH of the saltwater 101, but may also affect the SDN process by providing dissolved carbonate and bicarbonate (and in some cases, an abundance of such material) into the saltwater 101. In some aspects, such dissolved carbonate and bicarbonate may increase an efficiency (e.g., a rate at which nitrate is changed to nitrous oxide or nitrogen gas). In some aspects, the SDN reaction may be made more efficient by between 30-60% (e.g., increase a rate of nitrate to nitrogen gas or $N_xO_x$) when $CaCO_3$ is added to one or more of the tanks 206.

Further, in some aspects, the $CO_2$ injection system 228 may be fluidly coupled to the tank 206 that contains the calcium carbonate media 240 to deliver a flow of $CO_2$ gas into the tank 206. The gaseous $CO_2$, in some implementations, may dissolve or increase a rate of dissolution, of the calcium carbonate media 240 within the flow of saltwater 101, thereby increasing an efficiency of the SDN (e.g., increasing a rate of nitrate to nitrogen gas). In some aspects, for example in RAS, the flow of $CO_2$ may be delivered from a gas exchange system (not shown in this figure) that removes dissolved $CO_2$ from the saltwater 101. For example, harvested $CO_2$ (e.g., from a gas exchange system) may be introduced to the system 200 through the injected $CO_2$ in the tank 206 that contains the calcium carbonate media 240.

In some implementations, a particular tank 206 (or tanks 206) may hold sulphur media 230 and the calcium carbonite media 240 together. For example, in some implementations, the sulfur media 230, the denitrification bacteria, and the $CaCO_3$ (e.g., aragonite) may be mixed together within one or more of the tanks 206. In some aspects, the bacteria reside on the sulfur granules naturally and may require no other form of addition or supplementation from an operator of the system 100. In some aspects, multiple tanks 206 may include the media 230, bacteria, and aragonite, while other tanks 206 may include one or the other of the sulphur media 240/bacteria or the aragonite. In tanks 206 including both the media 240/bacteria and aragonite, the calcium carbonate media 240 may be placed atop the sulfur media 230, e.g., in a proportion of 8 to 1 sulfur to aragonite. The medias 230 and 240 may remain stratified and layered in this configuration, thus allowing the aragonite volume to be monitored and replenished when needed. In other aspects, the aragonite and sulphur media 230 may be blended together in the same tank 206 (or tanks 206) at proportions, e.g., as high as 1 to 1 sulfur to aragonite with no stratification or layering provided in this mix.

In this example, each tank 206 includes a backwash line 218 at an outlet of the tank 206 (e.g., between the tank 206 and the outlet header 204). In some aspects, for example, the backwash line 218 may be opened to allow flushing, and thus cleaning, of the sulphur and aragonite media within the tanks 206 (either individually or in combination). For instance, it may be desirable to backwash or increase the upwelling flow to each tank 206 separately and discharge a portion of the saltwater 101 to a recovery system (e.g., to reuse in the saltwater source 102) or a sanitary sewer, in order to reduce biological fouling of the media (e.g., media 230 or 240 or both) by bacterial sludge (e.g., heterotrophic). In some aspects, a backwash or discharge may help to undo channeling of sulfur media 230 that can often occur. For example, backwashing helps to keep the water moving consistently and in contact with as much of the sulfur volume as possible. Channeling can often lead to overly anoxic zones that can reduce efficiency and give off harmful hydrogen sulfide gasses.

In this example, each tank 206 also includes a gas release device 216 that is fluidly coupled to an inner volume of the tank 206. In some aspects, the gas release device 216 may be automatically operated based on a predetermined or present pressure within the volume of the tanks 206, to release a flow of gas 232 into an ambient environment. For example, the gas 232 may be nitrous oxide and/or nitrogen gas that results from the denitrification process within the tanks 206. As another example, other gasses, such as $CO_2$, may be released through the gas release device 216.

Additional gas release devices 224, as shown in this example, are positioned in the outlet header 204 downstream of the bypass conduit 220 and valve 234. An orifice 234, such as an expansion valve, is also positioned in the outlet header 204, upstream of the gas release device 224. In combination, the gas release device 224 and orifice 234 may operate to provide a pressure drop to further release gasses, such as nitrogen, into an ambient environment. For instance, the incorporation of the orifice 234 and adjacent gas release device 224, which may be positioned at an elevated location in the system 200 (and in some aspects a highest elevation in the system 200), may create a low or reduced pressure area of the recirculation loop, relative to other portions of the loop (e.g., the tanks 206, the inlet header 202). At this high elevation, low pressure area, nitrogen and other gasses within the saltwater 101 may bubble out of the liquid and be released into the ambient environment. For instance, due to a phase change as a result of the drop in pressure, newly release nitrogen and similar gasses can be immediately evacuated from the recirculation loop, thus preventing such gasses from dissolving back into solution (e.g., due to pumping of the saltwater 101 through the loop by pump 208).

As shown, another gas release device 224 may also be positioned in the bypass conduit 220 (in this example, downstream of the bypass valve 222). The bypass valve 222 and gas release device 224 may also be positioned at an elevated location in the system 200 (and in some aspects a highest elevation in the system 200). As noted, this elevated positioning may create a low or reduced pressure area of the recirculation loop, relative to other portions of the loop (e.g., the tanks 206, the inlet header 202). At this elevated low pressure area, nitrogen and other gasses within the saltwater 101 may bubble out of the liquid and be released into the ambient environment located just downstream of bypass valve 222, which is also operated in conjunction or in combination with the gas release device 224 in the bypass conduit 220.

The example system 200 includes a pump 208 and valve 210. The pump 208 (e.g., centrifugal or other form of pump and may be the same as pump 118) may circulate the saltwater 101 from the saltwater source 102 (e.g., as shown in FIG. 1) and into the inlet header 202 to flow through the recirculation loop. In some aspects, the valve 210 may be controlled (e.g., modulated) to vary a flow rate of the saltwater 101 that is circulated to all of the tanks 206. In alternative aspects, the valve 210 may be an isolation valve or a modulating valve, and the pump 208 may be controllably varied (e.g., with a variable frequency drive, step motor, or otherwise) to vary the flow rate of the saltwater 101. In other alternative implementations, the pump 208 and valve 210 may provide a constant or substantially constant flow rate of the saltwater 101 through the recirculation loop.

As noted, valves 212 and 214 are positioned at inlets and outlets, respectively, of the tanks 206. In some aspects, valves 212 and 214 may be shut-off isolation valves (e.g., able to fully close or fully open), which, when operated (e.g., manually or automatically), can fluidly isolate the tanks 206 (individually or in combination) from the recirculation loop. In alternative aspects, one or more of the valves 212 and 214 may be modulating control valves which, when operated, can modulate a flow rate of the saltwater 101 to the tanks (individually or in combination).

Other valves or flow control devices may be positioned in the recirculation loop as well. For example, as shown, modulating valve 222 (e.g., automatically or manually, or both) is positioned to control a flow rate of the saltwater 101 that is circulated from the outlet header 204 to the inlet header 202. Thus, the control valve 222 may be controlled to vary a flow rate of the saltwater 101 recirculated within the recirculation loop for further treatment (e.g., for further removal of nitrate, carbonate addition or both), as well as provide the optimal hydraulic retention time (HRT) of the exhibit water in the denitrification process. Thus, according to the example denitrification system 200, there may be two loops. A first loop comprises the inlet and outlet headers 202 and 204, respectively, and the bypass header 220. A second loop comprises the inlet and outlet headers 202 and 204, respectively, but not the bypass header 220. The first loop is pumped and recirculated (e.g., continuously) through the tanks 206, while the second loop titrates a small amount of saltwater 101 (e.g., relative to a total volume of saltwater 101 in the saltwater 102, or relative to an amount of saltwater 101 circulated through the saltwater treatment system 100) from the saltwater source 102 into the first loop and back out again to the saltwater source 102.

In some aspects, the first loop contains the saltwater 101 circulated at particular parameter (e.g., pressure, velocity) to efficiently utilize a full volume and surface area of the denitrification media 230 (e.g., sulfur) and bacteria inside the tanks 206. In some aspects, to ensure such parameters are met, a particular volume of saltwater 101 may be looped through the tanks 206 in multiple passes to achieve effective (e.g., achieving a particular nitrate concentration) denitrification of that volume of saltwater 101. In some aspects, such multiple passes may better achieve effective denitrification relative to, for example, a quantity of media volume inside the tanks 206. Thus, effective denitrification may be achieved in system 200 with smaller tanks relative to conventional denitrification systems.

In some aspects, a flow rate of the saltwater 101 through the second loop (e.g., from and to the saltwater source 102) may be controlled to not overwhelm the flow of the saltwater 101 in the first loop. For instance, if too much saltwater 101 is circulated into the second loop, effective denitrification may not occur in the first loop, a dissolved oxygen level may rise, and an overall nitrate concentration may rise or not decrease in order to account for, e.g., food and animal excretion in the saltwater 101.

In an example operation of system 200, saltwater 101 from the saltwater source 102 is circulated into the inlet header 202 and, in parallel, to the tanks 206. In some aspects, a flow rate of the saltwater 101 circulated through each tank 206 is similar, substantially similar, or identical. Within at least a portion of the tanks 206, the saltwater 101 flows through the media 230 and denitrification bacteria, and the denitrification process transforms the nitrate within the saltwater 101 to nitrogen gas as previously described. Nitrous oxide or nitrogen gas is released from the tanks 206 through the gas release devices 216. As shown, within at least one of the tanks 206, the saltwater 101 flows through the media 240, through which a calcium carbonate (e.g., aragonite) addition process occurs, as well as a pH balancing process (e.g., pH is maintained at a minimum of at least 5.5). Further, as the media 240 comprises $CaCO_3$ or aragonite, bits of such media are dissolved into the saltwater 101. In some aspects, the $CO_2$ injection device introduces gaseous $CO_2$ into the tank 206 that holds the calcium carbonate media 240, thereby further dissolving or increasing a dissolution rate of the $CO_2$ and carbonate into the saltwater 101. Treated saltwater 101 flows from the tanks 206 into the outlet header 204. A portion of the treated saltwater 101 flows back to the inlet header 202 through the bypass header 220, while another portion of the treated saltwater 101 flows back to the saltwater source 102. The portion of the treated saltwater 101 that flows through the bypass header 220 may join an additional flow of saltwater 101 from the saltwater source 102 and be circulated back to the tanks 206.

In an additional operation or aspect of this example, a temperature control system 242 may be included within the system 200, e.g., within the bypass conduit 220. For example, a heating source within the temperature control system 242 may operate (e.g., powered by gas, electricity, solar, or other energy form) to heat the saltwater 101 within the recirculation loop of the system 200. For example, temperature control system 242 may be operated (e.g., automatically or manually) to maintain a temperature of the saltwater in the recirculation loop at or about 20° C. to 22° C. (e.g., as a setpoint temperature). The temperature control system 242 may include a thermostat that measures the temperature of the saltwater 101 in the bypass conduit 220 and a heating source. In some aspects, the temperature control system 242 may not include a heating source but may be communicably coupled to a controller that controls a heating source within the system 200 based on temperature measurements from the system 242.

In another example operation or aspect of this example, an ozone gas injection and pressurized tank contact system 244 may be included within the system 200 (e.g., downstream of the orifice 234 and gas release device 224) to treat the saltwater 101 before returning to the tank 102. In some aspects, this ozone gas injection and pressurized tank contact system 244 may be operated in addition to the ozone system 114 shown in FIG. 1. In some aspects, this ozone gas injection and pressurized tank contact system 244 may be operated alternatively to the ozone system 114 shown in FIG. 1 and, in some cases, may replace the ozone system 114. Thus, in some aspects, the denitrification system 200 may include an ozone system (in accordance with the present disclosure) as a single package. In operation, a sulphur denitrification process may create reduced chemical species that, if left untreated, may be detrimental to animals that live in the saltwater source 102. Oxidizing the saltwater 101 before it returns to the saltwater source 102 may treat such effluent to ensure no harmful effects to, e.g., animals that live in the saltwater source 102 (e.g., aquarium or aquaculture habitat). The ozone gas injection and pressurized tank contact system 244 may include an oxidation-reduction potential (ORP) sensor that measures the ability of the saltwater 101 to act as an oxidizing or reducing agent in order to control the dosage of ozone from the system 244 to the saltwater 101. The ORP sensor, in operation, provides feedback to a controller that, in turns, may control the system 244, the ozone system 114, or both, to maintain ORP values in the saltwater 101 above 200 millivolts but not exceeding 400 millivolts.

Turning to FIG. 2B, this figure illustrates an example implementation of a sulphur denitrification system 250 that, in some aspects, may be implemented as the denitrification system 112 shown in FIG. 1. As shown in FIG. 2B, system 250 generally includes two denitrification systems 200 that are fluidly coupled to receive a flow of saltwater 101 from the saltwater source 102, treat the flow of saltwater 101 (e.g., through a denitrification process and pH balancing process), and return at least a portion of the treated saltwater 101 to the saltwater source 102. Thus, within the denitrification system 250, each system 200 may be a subsystem that can be operated and controlled independent or in tandem to provide for denitrification, pH balancing, or both, of the saltwater 101. Further example denitrification systems may include three or more subsystems 200, e.g., fluidly coupled in parallel with the saltwater source 102. Also, each subsystem 200 within the system 250 may include more tanks 206 or fewer tanks 206, including more or fewer tanks 206 with denitrification media 230 and more or fewer tanks 206 with calcium carbonate media 240. Example operations of each subsystem 200 within system 250 may be similar to that previously described, and may be implemented independently per subsystem 200 (e.g., components of each subsystem 200 may be controlled to different parameters or desired outputs) or in tandem (e.g., components of each subsystem 200 may be controlled to the same or similar parameters or desired outputs).

Figure 3A:
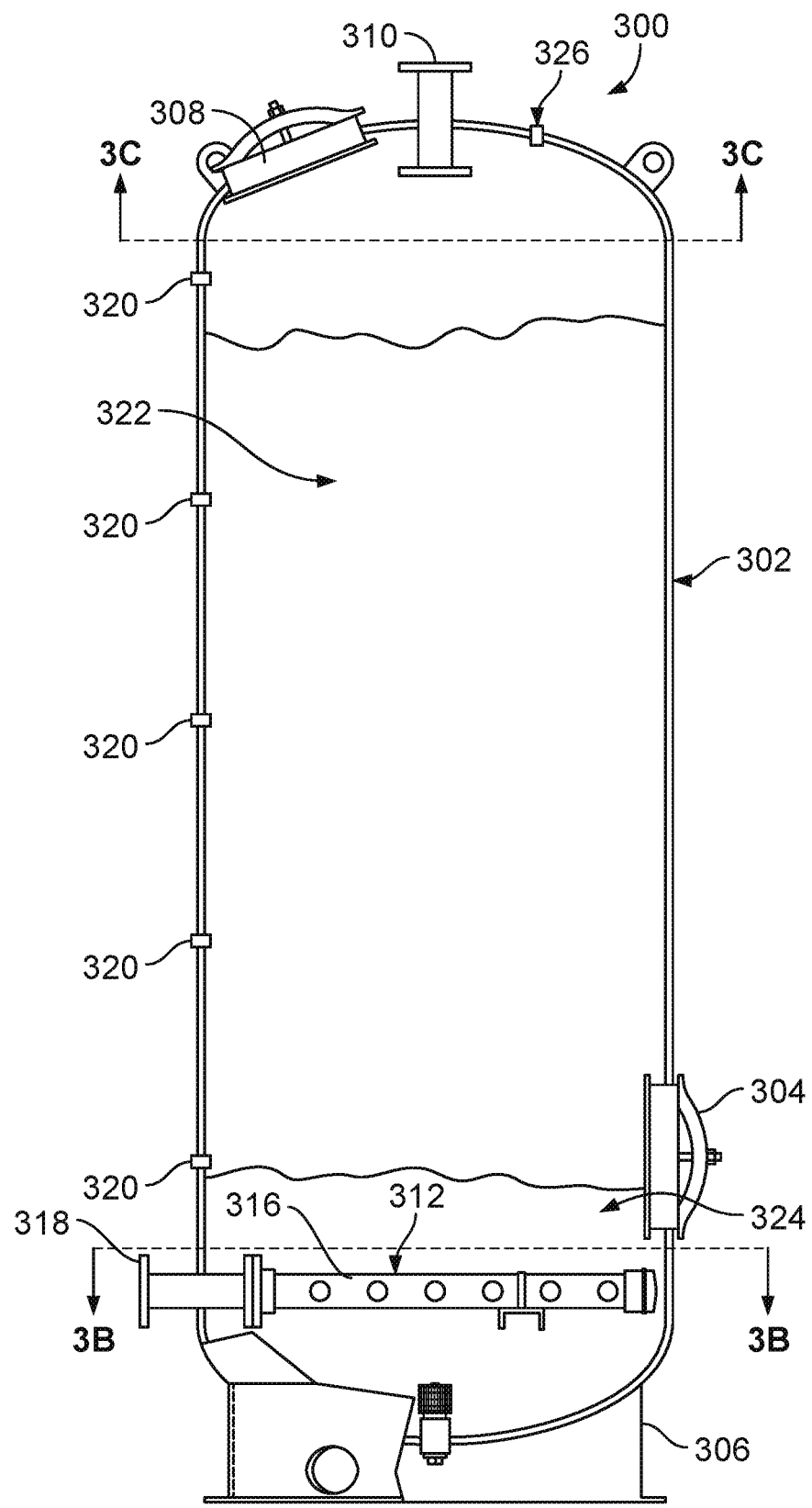
FIGS. 3A-3C illustrate an example implementation of a tank for a denitrification system according to the present disclosure.
Figure 3B:
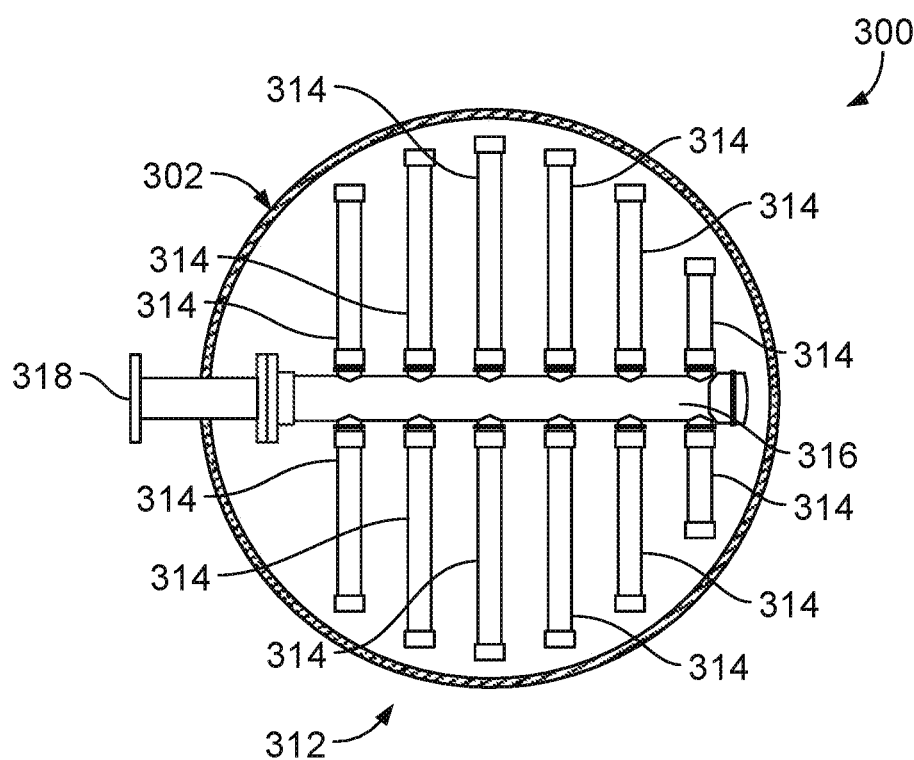
Figure 3C:
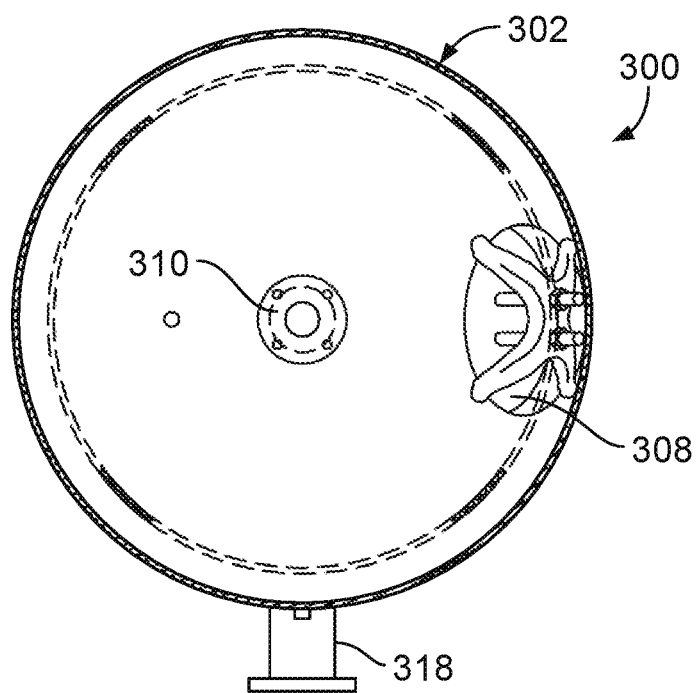

FIGS. 3A-3C illustrate an example implementation of a tank 300 for a denitrification system. In some aspects, the tank 300 may be similar or identical to one or more of the tanks 206 shown in FIGS. 2A and 2B. Thus, tank 300 may be utilized in a denitrification process (e.g., with denitrification media 230), a pH balancing and aragonite addition process (e.g., with calcium carbonate media 240), or both. FIG. 3A shows a side cutaway view of the tank 300. FIG. 3B shows a sectional plan view of a bottom portion of the tank 300 that includes a saltwater inlet manifold 312. FIG. 3C shows a sectional plan view of a top portion of the tank 300 that includes a saltwater outlet 310.

Tank 300, in this example, includes a shell 302 that encloses a volume and is supported on a base 306. In this figure, the tank 300 is illustrated as vertically-oriented, e.g., a long axis of the volume is oriented vertically with respect to a floor on which the tank 300 is supported. Thus, the long axis is aligned in a direction of gravity. In some aspects, each of the tanks 206 shown in FIGS. 2A-2B are also vertically-aligned. By vertically-aligning the tank 300, a flow of saltwater to be treated within the tank 300 achieves sufficient contact, and sufficient time in contact, with a process media 322 (e.g., a denitrification media, such as sulphur, that supports denitrification bacteria, or a calcium carbonate media, such as $CaCO_3$). In the example tank 300, the media 322 may be sulphur that supports denitrification bacteria. The sulphur 322 may also be supported on a bed of pea gravel 324, positioned at a bottom portion of the shell 302.

The shell 302 includes a number of appurtenances. For example, access panels 304 and 308 may be positioned, as shown, in lower and upper portions of the shell 302, respectively. Such access panels 304 and 308 may be openable to provide human access or visual access into the volume of the shell 302 (e.g., for inspection, cleaning, or otherwise). Further, sample ports 320 may be positioned vertically along the shell 302 to perform manual water sampling, e.g., of the media 322 and saltwater that is flowing through the media 322.

As shown more clearly in FIG. 3B, the saltwater inlet manifold 312 includes an inlet 318 that is fluidly coupled with multiple outlet branches 314 through a header 316. Ends of the outlet branches 314 that are proximate to the shell 302 include openings to allow the saltwater to flow from the inlet 318, through the header 316, and into the volume of the shell 302 through the branches 314. As shown, the outlet branches 314 are dispersed (e.g., evenly) through the volume of the shell 302 within the pea gravel 324. In some aspects, such dispersion may provide for even or substantially even flow of the saltwater from the bottom portion of the shell 302 vertically upward through the volume and to the saltwater outlet 310. In some aspects, one or more of the outlet branches 314 may have perforations or finely machined slits arranged along a length of the branch 314, thereby providing for saltwater output from the perforations without allowing media to fall into or enter the outlet branches 314. In alternative implementations, there may be a single inlet for the saltwater into the shell 302, rather than a manifold with multiple outlets. In further alternative implementations, an outlet distribution manifold may be utilized with perforations or finely cut slits that is similar to the inlet manifold outlet 312. For example, an outlet manifold may prevent or help prevent media 322 inside the vessel 302 from escaping into the outlet 310. Additionally, for this purpose, a screen, perforated plate, or other containment mechanism may be utilized to keep the media 322 from escaping the tank 300.

In this example, the saltwater outlet 310 is positioned on the top of the vessel sidewall 302 and aligned with a vertical axis of the shell 302. In alternative implementations, the saltwater outlet 310 may be positioned on the top of the shell 302 but offset from the vertical axis of the shell 302, or from a lateral side of the shell 302 near the top.

In operation, saltwater is circulated (e.g., forcibly) through the inlet 318 and into the saltwater inlet manifold 312. The saltwater exits, for example, branches 314 of the manifold 312, such as through perforations or finely machined slits in the branches 314, outlets at ends of the branches 314, or both. The saltwater is circulated through the pea gravel 324 and into the media 322. In the case of a denitrification tank 300, the saltwater circulated through the media 322 that supports denitrification bacteria. The denitrification process, as earlier described, occurs in the media 322. Nitrate is transformed, by the bacteria, to nitrite and then to nitrous oxide and/or nitrogen gas, which can exit the tank 300 through a gas release device that may be connected to a gas relief connection 326 positioned at a top of the shell 302. In the case of a pH balancing tank 300, the media 322 may include $CaCO_3$ or aragonite, which dissolves into the saltwater. The treated saltwater flows from the media 322 into the top of the shell 302 and exits the tank 300 through the saltwater outlet 310.

Figure 4:
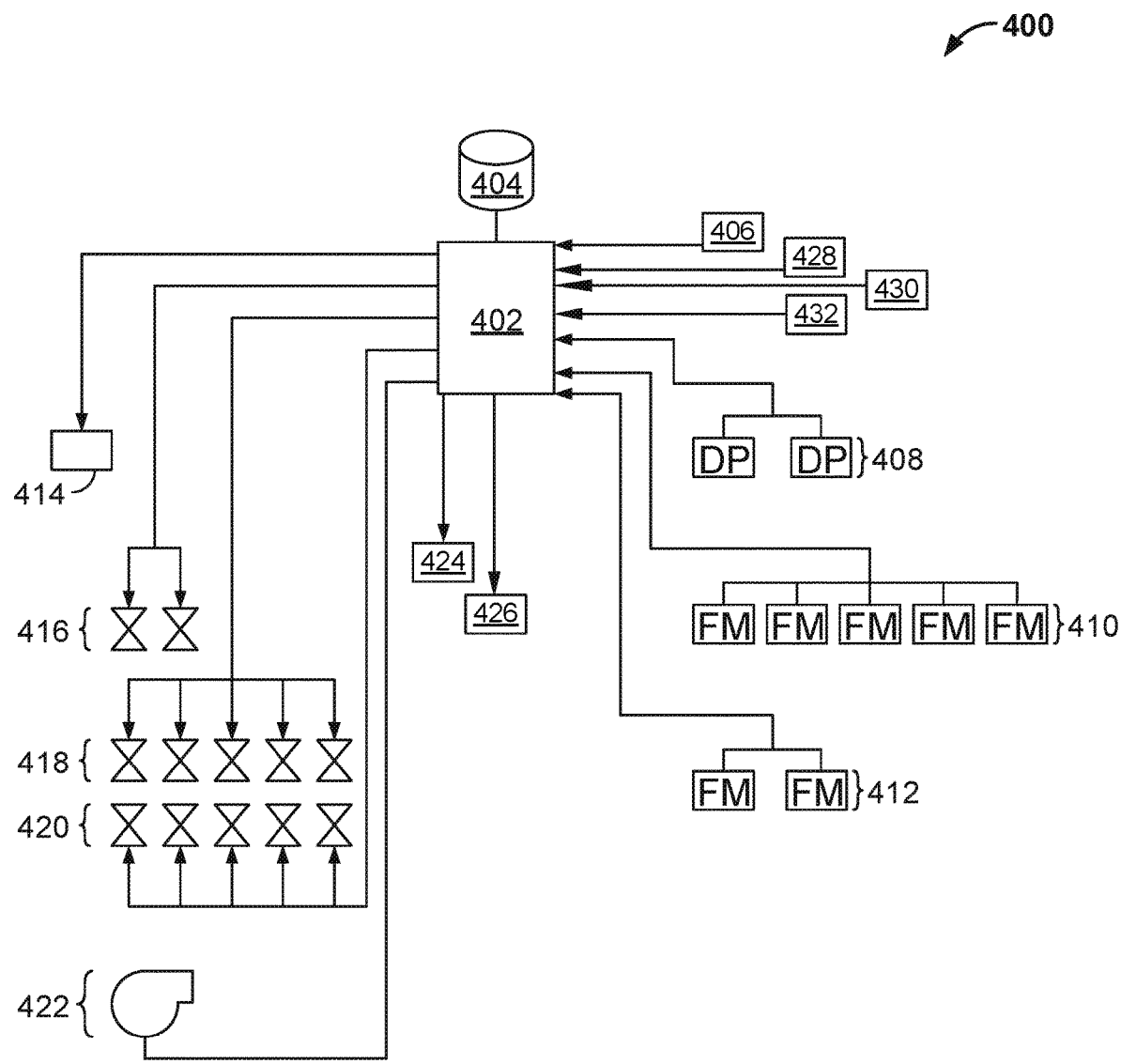
FIG. 4 illustrates a schematic diagram of a control system for a denitrification system according to the present disclosure.

FIG. 4 illustrates a schematic diagram of a control system 400 for a denitrification system. For example, control system 400 may be used to control, e.g., the denitrification system 112, denitrification system 200, denitrification system 250, or other denitrification system in accordance with the present disclosure. As illustrated, the control system 400 includes a controller 402 (e.g., microprocessor based, PLC, electromechanical, pneumatic, or other form of controller) that is communicably coupled to a database 404, as well as inputs (shown with connecting arrows into the controller 402) and outputs (shown with connecting arrows away from the controller 402). One or both of the controller 402 and database 404 may store instructions coded on non-transitory computer-readable media that, with the controller 402, transforms inputs and setpoints (e.g., provided by an operator of the control system 400) into outputs to control one or more components of a denitrification system.

As illustrated, there may be multiple components of a denitrification system that provide inputs to the controller 402. For example, a nitrate concentration sensor 406 may be positioned within a denitrification system (e.g., within a flow conduit that carries a flow of saltwater or freshwater that contains nitrate, within a denitrification tank, or elsewhere in contact with the saltwater) to measure a concentration of nitrate in a flow of saltwater (e.g., in parts per million or other units). The measurement of the nitrate concentration (e.g., as a percentage or absolute value) may be transmitted to the controller 402. In some aspects, the nitrate concentration sensor 406 may measure a nitrate concentration differential between a flow of saltwater entering the denitrification system and a flow saltwater leaving the denitrification system. In some examples, the nitrate concentration sensor 406 may be a NITRATAX from Hach Company. As another example, the sensor 406 may be a Sea-Bird Coastal SUVA Optical Nitrate Sensor from OTT Hydromet. In some aspects, the sensor 406 may include a reagent based analyzer with photo cell for measuring nitrate. The sensor 406 may output a 4-20 mA signal with onboard 24 VDC relays for control of process equipment, e.g., through the controller 402.

The controller 402 may also receive differential pressure (DP) measurements from one or more differential pressure sensors 408 (e.g., shown here as two sensors). For example, with reference to denitrification system 200 shown in FIG. 2A, DP sensors 408 may be positioned to measure a fluid pressure difference across the pump 208 and between the outlet header 204 and the inlet header 202. Such measurements may be used by the controller 402, for example, to determine relative flow rates of the saltwater flowing through the recirculation loop of system 200.

The controller 402 may also receive inputs from one or more flow meters 410 (e.g., five shown here but more or fewer are also contemplated) and 412 (shown as two but may be more or fewer). For example, in some aspects, a flow meter 410 may be positioned at an inlet or an outlet of each tank 206 of the system 200 shown in FIG. 2A in order to measure a flow rate of saltwater through each individual tank 206. In some aspects, flow meters 412 may also be positioned in the recirculation loop at, e.g., one or more of the inlet header 202, the outlet header 204, or the bypass header 220. Each flow meter 410/412 may measure a flow rate (in gpm or other units) of the saltwater at the particular location in which the flow meter 410/412 is positioned and provide the measurement to the controller 402.

The controller 402 may also receive inputs from a thermostat or temperature sensor 428 that is part of a temperature control system (e.g., temperature control system 242 shown in FIG. 2A). The thermostat 428 may periodically provide temperature measurements of, e.g., a saltwater flow within the denitrification system. In turn, the controller 402 may also be communicably coupled to a heater system 424 of the temperature control system that is positioned in a recirculating loop of the denitrification system (e.g., within a bypass conduit of the loop or other location).

The controller 402 may also receive inputs from an ORP sensor 430 (e.g., as part of the ozone gas injection and pressurized tank contact system 244 shown in FIG. 2A). The ORP sensor 430 can measure the ability of the saltwater 101 to act as an oxidizing or reducing agent. In turn, the controller 402 is also communicably coupled to control an ozone system 426, e.g., the ozone gas injection and pressurized tank contact system 244, the ozone system 114, or both in cases which include two separate ozone systems.

The controller 402 may also receive inputs from a dissolved oxygen (DO) sensor 432. The DO sensor 432 can be positioned in the denitrification system to measure an amount of dissolved oxygen in the saltwater. For example, in some aspects, an oxygen sensor may be placed within the recirculation loop (e.g., at or near an inlet or outlet of one or more of the tanks, in the inlet header, in the outlet header, in the bypass header) to measure a concentration of dissolved oxygen in the saltwater. In some aspects, for example, such as when the denitrification system is an autotrophic denitrification system using facultative denitrification bacteria, the denitrification process may be most efficient when the oxygen concentration is kept relatively low. For instance, facultatively anaerobic bacteria, when located in an anaerobic environment, utilize alternative oxygen sources such as nitrate, as an alternative oxygen source. Thus, the bacteria in a sulphur denitrification system may more efficiently transform nitrate into nitrogen gas when the environment is anaerobic. Anaerobic conditions, however, may be difficult to achieve in a closed system aquaria due to the anaerobic conditions required of such habitats (e.g., due to animal requirements).

As illustrated, the controller 402 may be communicably coupled (e.g., wirelessly or wired) to control the operation of multiple components of a denitrification system, such as denitrification system 200. For example, the controller 402 may be communicably coupled to a $CO_2$ injection device 414, which, e.g., can be the $CO_2$ injection device 228 described in FIG. 2A. The controller 402 may also be communicably coupled to control valves 416 that are positioned, respectively, e.g., in the bypass header 220 and inlet header 202 in the denitrification system 200. The controller 402 may also be communicably coupled to control valves 418 and 420 that are positioned, respectively, at inlets of the tanks 206 and outlets of the tanks 206 in the denitrification system 200. The controller 402 may also be communicably coupled to one or more pumps 422 (one shown here but more or fewer are possible). For example, pump 422 may represent the recirculation pump 208 shown in the denitrification system 200.

In some aspects, valves 416 may be controllably modulated between fully open and fully closed to modulate a flow rate of the saltwater circulated therethrough. In contrast, valves 418 and 420 may be controllably operated to fully shut or fully open. However, in alternative implementations, each valve 416/418/420 may be a modulating valve (e.g., controlled to modulate between fully open and fully closed).

In some aspects, the pump 422 may also be controlled to be on (e.g., full or nameplate power) or off (e.g., no power). Thus, operation of one or more of the valves 416/418/420 may control flow rates of the saltwater circulating through the denitrification system. Based on the operation of each of the valves 416/418/420, some portions of the saltwater may flow at different flow rates as compared to other portions of the saltwater within the denitrification system. In a specific example implementation, the pump 422 may be controlled to circulate the saltwater at a constant or substantially constant flow rate, while the valve 416 positioned in a bypass header (e.g., bypass header 220) is modulated to control the flow rate of the saltwater through the denitrification system. Valves 418/420 may be isolation valves in this example implementation, controlled (with control system 400 or manually) to be fully open or fully closed.

In another specific example implementation, the pump 422 may be controlled to vary a flow rate of the saltwater, such as by a variable frequency drive, step-motor, or other motor controller. In this specific implementation, all of the valves 416/418/420 may be isolation valves (e.g., fully open or fully closed) and the pump 422 is responsible for controlling and modulating the flow rate of the saltwater in the recirculation loop of the denitrification system. In some cases, even in this example, the valve 416 in the bypass header may be a modulating valve.

The controller 402 can receive the example inputs described previously and use one or more of the inputs and setpoints stored in the database 404 in one or more operational algorithms stored as instructions in the controller 402 to control the components of the denitrification system. In an example operation of the controller 402, a nitrate concentration measurement may be sent to the controller 402 from the nitrate concentration 406. In some cases, this measurement may be sent dynamically (e.g., in real time as saltwater is flowing through the denitrification system) and periodically (e.g., every minute, every hour, every day, or other time period). The controller 402 compares the measured nitrate concentration in the saltwater against a nitrate setpoint value (or setpoint range), e.g., set by an operator and stored in the controller 402 or database 404. If the measured concentration is less than or equal to the setpoint, the controller 402 may take no action.

If the measured concentration is above the setpoint value or upper end of a setpoint range, the controller 402 may provide signals to one or more components of the denitrification system in order to decrease the concentration of nitrate within the saltwater. For example, the controller 402 may signal valve 416 in the bypass header (or any of valves 416/418/420, independently or in combination) to increase a percent open state of the valve. In some aspects, for example, as the valve 416 in the bypass header opens, more saltwater from outlets of the denitrification tanks is recirculated back to inlets of the denitrification tanks. This may increase a hydraulic retention time of the saltwater within the denitrification system (e.g., within the recirculation loop of the denitrification system). As hydraulic retention time of the saltwater in the denitrification system increases (e.g., as a number of passes a particular volume of the saltwater flows through the denitrification tanks), more nitrate may be changed to nitrite and then to nitrogen gas, thereby decreasing a nitrate concentration in the saltwater. As the controller 402 receives additional nitrate concentration measurements from the nitrate concentration sensor 406, the controller 402 may continue to open the valve 416 or cease opening the valve 416 (e.g., when the measured value is less than the setpoint).

The controller 402 may also or alternatively signal pump 422 to decrease a flow rate of the saltwater circulating within the recirculation loop of the denitrification system. For example, as the pump 220 slows down, the saltwater within the recirculation loop spends more time circulating (e.g., vertically from bottom to top) through the denitrification tanks. This may also increase a hydraulic retention time of the saltwater within the denitrification system (e.g., within the recirculation loop of the denitrification system), which, as described previously, may increase a rate of change of nitrate to nitrogen gas in the denitrification process. As the controller 402 receives additional nitrate concentration measurements from the nitrate concentration sensor 406, the controller 402 may continue to decrease the speed of the pump 422 or cease changing the speed of the pump 422 (e.g., when the measured value is less than the setpoint).

The controller 402 may also or alternatively signal $CO_2$ injection device 414 to increase an amount of $CO_2$ injected into a pH balancing tank of the denitrification system. For example, as more $CO_2$ is injected into the pH balancing tank, the $CaCO_3$ or aragonite within the tank may more quickly dissolve in the saltwater. As the concentration of $CaCO_3$ or aragonite within the saltwater in the recirculation loop increases, the denitrification process may also increase. As the controller 402 receives additional nitrate concentration measurements from the nitrate concentration sensor 406, the controller 402 may continue to increase the rate of $CO_2$ injected into the pH balancing tank or keep the $CO_2$ injection rate constant (e.g., when the measured value is less than the setpoint).

In another example operation, the controller 402 may compare the temperature measurements from the sensor 428 to a setpoint temperature and, based on the comparison, operate the heater 424 (or other component, such as one or more valves 416/418) to maintain the saltwater flow at or above the predetermined set point. For example, if the measured temperature is too low, the heater 424 may be actuated or increased in power, or one or more valves 416/418 may be adjusted to limit the flow, to heat the flow of saltwater.

In other example operations, the DO sensor 432 measures an amount of dissolved oxygen in the saltwater and provides the measurement to the controller 402. The controller 402 may compare the measured DO against a setpoint value for DO, e.g., set by an operator and stored in the controller 402 or database 404. In some aspects, the setpoint may be below about 3.0 mg/l or 40% saturation, which are considered minimums for denitrification to occur. In some aspects, the setpoint may be between about 0.10 mg/l to 2.0 mg/l for ideal SDN to occur.

The DO measurement may be sent dynamically (e.g., in real time as saltwater is flowing through the denitrification system) and periodically (e.g., every minute, every hour, every day, or other time period) from the sensor 432 to the controller 402. If the measured DO is less than or equal to a setpoint (or within a setpoint range), the controller 402 may take no action. If the measured concentration is greater than the setpoint value or outside of a setpoint range, the controller 402 may provide signals to one or more components of the denitrification system in order to decrease the concentration of oxygen within the saltwater. For example, to reduce a DO concentration, the controller 402 may control a valve 416 in an inlet header to circulate less saltwater from the source into the denitrification system. By reducing a flow rate of the saltwater into the denitrification system, a hydraulic retention rate of the recirculating saltwater is increased and DO decreases.

In other example operations, a theoretical nitrate removal may be calculated by the controller 402. For example, the controller 402 may calculate the theoretical nitrate removal by using measured values of a flow rate passing through the denitrification system and returning to the saltwater water source (e.g., the second loop) and a difference between an entering nitrate concentration and a leaving nitrate concentration (e.g., entering the second loop and leaving the second loop). Such a difference may be a delta nitrate for the SDN process and can be used by the controller 402 to calculate a net nitrate flux for the SDN process. This net nitrate flux can be displayed as an input and possibly entered as a set point for the controller 402, thus creating outputs for the controller 402 to attempt to achieve or maintain.

The controller 402, during these processes, may also periodically receive other values, such as differential pressure values from sensors 408 and flow rate values from sensors 410 and 412 and compare such values to corresponding setpoints (or setpoint ranges) of differential pressure and flow rate to ensure that such measured values are within acceptable ranges. For example, the controller 402 may implement a feedback loop that periodically receives such measurements as differential pressure values, flow rates, temperatures, and other measurements from sensors in the denitrification system and compares such values to stored setpoints (or setpoint ranges) associated with these values (e.g., set by an operator of the control system 400). If the measured values do not meet the setpoints (or are outside of setpoint ranges), the controller 402 may adjust one or more components (e.g., valves 416/418/420, pump 422, or other component) until the measured values meet the setpoints or are within the setpoint ranges.

In some aspects, the controller 402 may compare values of input devices such as flow, temperature, dissolved oxygen, pH, or ORP, and compare the measured values against predetermined alarm parameters that can be set in the database 404. If the input parameters are measured as out of safe range, then an executable action can be taken to shut down or isolate the system and create a "lock-out" condition that must be cleared by an operator before normal running conditions can be re-established. The alarms can also be generated as an output device including visible, audible, or notification alarm sent out as a phone or text based message using wireless or IP connections.

Figure 5:
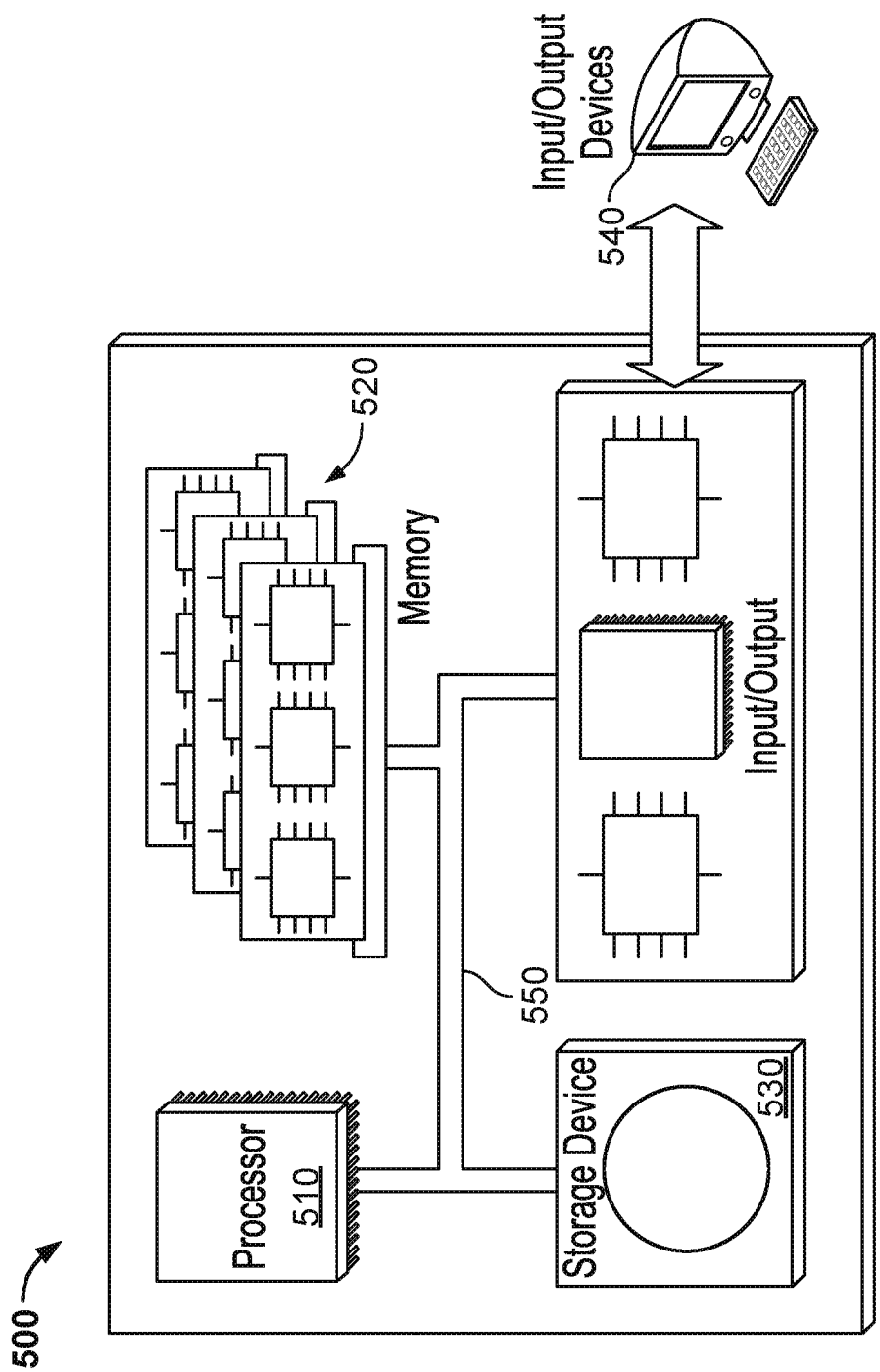
FIG. 5 illustrates a schematic diagram of a controller of a control system that may be applied to any of the computer-implemented methods and other techniques described in the present disclosure.

FIG. 5 is a schematic diagram of a controller 500 for a control system, such as the controller 402 for control system 400. The controller 500 can be used to carry out the operations described in association with any of the computer-implemented methods described previously, according to some implementations, such as implementations of an injectant detection system and process. In some implementations, computing systems and devices and the functional operations described in this specification can be implemented in digital electronic circuitry, in tangibly-embodied computer software or firmware, in computer hardware, including the structures disclosed in this specification (e.g., control system 400) and their structural equivalents, or in combinations of one or more of them. The controller 500 is intended to include various forms of digital computers, such as laptops, desktops, workstations, personal digital assistants, servers, blade servers, mainframes, and other appropriate computers, including vehicles installed on base units or pod units of modular vehicles. The controller 500 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 500 includes a processor 510, a memory 520, a storage device 530, and an input/output device 540. Each of the components 510, 520, 530, and 540 are interconnected using a system bus 550. The processor 510 is capable of processing instructions for execution within the controller 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In an implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the controller 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the controller 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described previously as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described previously should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Thus, particular implementations of the present disclosure have been described but others are contemplated by the present disclosure as well. For example, although the present disclosure uses saltwater as an example liquid to be treated, e.g., through denitrification, pH balancing, and other treatments, the concepts discussed herein can be applied to non-saltwater sources as well, including freshwater habitats that support fish and other animals. Other implementations are within the scope of the following claims.

What is claimed is:

1. A computer implemented method performed with a computing system that comprises one or more hardware processors, the method comprising:
   receiving, from at least one sensor of a marine habitat system, a measurement associated with a nitrate concentration in a flow of water, the marine habitat system comprising a water holding tank that comprises a volume of water that includes nitrate and a denitrification system fluidly coupled to the water holding tank to receive a flow of water from the water holding tank, circulate the flow of water through a plurality of denitrification tanks, and transform at least a portion of the nitrate into nitrogen gas in the tanks;
   controlling at least one of a pump or a valve of the denitrification system to circulate at least a portion of the flow of water from outlets of the plurality of denitrification tanks to an inlet of at least one of the plurality of denitrification tanks;
   controlling the at least one of the pump or the valve of the denitrification system to circulate another portion of the flow of water from the outlets of the plurality of denitrification tanks to the water holding tank;
   comparing the measurement with a nitrate concentration setpoint; and
   adjusting a component of the denitrification system based on the measurement exceeding the nitrate concentration setpoint.

2. The computer implemented method of claim 1, wherein adjusting a component of the denitrification system comprises:
   modulating the valve of the denitrification system to change a rate of the flow of water recirculated directly from outlets of the plurality of denitrification tanks to the inlet of the at least one of the denitrification tanks.

3. The computer implemented method of claim 2, wherein adjusting a component of the denitrification system further comprises injecting a carbon dioxide fluid into a pH balancing tank of the denitrification system to increase a rate of dissolution of calcium carbonate or aragonite into the flow of water, the method further comprising:
   increasing a rate of nitrate concentration reduction in the flow of water based on the increased rate of dissolution of calcium carbonate or aragonite into the flow of water.

4. The computer implemented method of claim 2, wherein adjusting a component of the denitrification system further comprises:
   adjusting a speed of the pump of the denitrification system to change a rate of the flow of water from the water holding tank to the denitrification system.

5. The computer implemented method of claim 4, further comprising:
   measuring a pH level of the flow of water; and
   based on the measured pH level being different than a threshold value pH, controlling a gas injection device to inject carbon dioxide into at least one of the denitrification tanks.

6. The computer implemented method of claim 2, wherein adjusting a component of the denitrification system further comprises:
   injecting a carbon dioxide fluid into a pH balancing tank of the denitrification system to increase a rate of dissolution of calcium carbonate or aragonite into the flow of water.

7. The computer implemented method of claim 1, wherein adjusting a component of the denitrification system comprises:
   adjusting a speed of the pump of the denitrification system to reduce a rate of the flow of water from the water holding tank to the denitrification system.

8. The computer implemented method of claim 7, wherein adjusting a component of the denitrification system further comprises injecting a carbon dioxide fluid into a pH balancing tank of the denitrification system to increase a rate of dissolution of calcium carbonate or aragonite into the flow of water, the method further comprising:
   increasing a rate of nitrate concentration reduction in the flow of water based on the increased rate of dissolution of calcium carbonate or aragonite into the flow of water.

9. The computer implemented method of claim 7, wherein adjusting a component of the denitrification system further comprises:
   modulating the valve of the denitrification system to change a rate of the flow of water recirculated directly from outlets of the plurality of denitrification tanks to the inlet of the at least one of the denitrification tanks.

10. The computer implemented method of claim 9, further comprising:
    measuring a pH level of the flow of water; and
    based on the measured pH level being different than a threshold value pH, controlling a gas injection device to inject carbon dioxide into at least one of the denitrification tanks.

11. The computer implemented method of claim 7, wherein adjusting a component of the denitrification system further comprises:
    injecting a carbon dioxide fluid into a pH balancing tank of the denitrification system to increase a rate of dissolution of calcium carbonate or aragonite into the flow of water.

12. The computer implemented method of claim 1, wherein adjusting a component of the denitrification system comprises:
    injecting a carbon dioxide fluid into a pH balancing tank of the denitrification system to increase a rate of dissolution of calcium carbonate or aragonite into the flow of water.

13. The computer implemented method of claim 12, further comprising increasing a rate of nitrate concentration reduction in the flow of water based on the increased rate of dissolution of calcium carbonate or aragonite into the flow of water.

14. The computer implemented method of claim 1, wherein adjusting a component of the denitrification system comprises:
    adjusting an expansion valve of the denitrification system to decrease a pressure of the flow of water circulated from the denitrification system back to the water holding tank.

15. The computer implemented method of claim 1, wherein the flow of water comprises a flow of saltwater.

16. The computer implemented method of claim 1, further comprising controlling a gas release device positioned at or near a top portion of at least one of the denitrification tanks to open and fluidly couple the volume of the at least one of the denitrification tanks to an ambient environment at or above a set pressure.

17. The computer implemented method of claim 1, further comprising:
   measuring a temperature of the flow of water; and
   operating a heater to raise the temperature of the flow of water based on the measuring.

18. The computer implemented method of claim 1, further comprising:
   measuring oxidation in the flow of water with at least one oxidation reduction potential sensor; and
   operating one or more ozone contactors mounted to inject ozone into the flow of water based on the measured oxidation.

19. The computer implemented method of claim 1, wherein the marine habitat system comprises at least one of an aquarium or a recirculating aquaculture system.

20. The computer implemented method of claim 1, further comprising:
   measuring a pH level of the flow of water; and
   based on the measured pH level being different than a threshold value pH, controlling a gas injection device to inject carbon dioxide into at least one of the denitrification tanks.

* * * * *